US 9,424,832 B1
Aug. 23, 2016

(12) United States Patent
Isaac

(10) Patent No.: US 9,424,832 B1
(45) Date of Patent: Aug. 23, 2016

(54) METHOD AND APPARATUS FOR SAFELY AND RELIABLY SENDING AND RECEIVING MESSAGES WHILE OPERATING A MOTOR VEHICLE

(71) Applicant: Ronald Isaac, San Ramon, CA (US)

(72) Inventor: Ronald Isaac, San Ramon, CA (US)

( * ) Notice: Subject to any disclaimer, the term of this patent is extended or adjusted under 35 U.S.C. 154(b) by 125 days.

(21) Appl. No.: 14/322,791

(22) Filed: Jul. 2, 2014

(51) Int. Cl.
*G10L 13/02* (2013.01)
*H04W 4/14* (2009.01)

(52) U.S. Cl.
CPC . *G10L 13/02* (2013.01); *H04W 4/14* (2013.01)

(58) Field of Classification Search
USPC .......................... 704/258, 259, 260, 270, 275
See application file for complete search history.

(56) References Cited

U.S. PATENT DOCUMENTS

| | | |
|---|---|---|
| 3,930,938 A | 1/1976 | Berglund et al. |
| 3,985,850 A | 10/1976 | Seefluth |
| 4,003,310 A | 1/1977 | Decker, II |
| 4,172,762 A | 10/1979 | Anthony et al. |
| 4,205,236 A | 5/1980 | Goof |
| 4,371,163 A | 2/1983 | Shaffer et al. |
| 4,459,578 A | 7/1984 | Sava et al. |
| 4,468,162 A | 8/1984 | Kuromoto |
| 4,516,939 A | 5/1985 | Crimmins, Jr. |
| 4,553,734 A | 11/1985 | Oka et al. |
| 4,654,647 A | 3/1987 | Wedam |
| 4,899,138 A | 2/1990 | Araki et al. |
| 5,166,462 A | 11/1992 | Suzuki et al. |
| 5,244,066 A | 9/1993 | Mackoway et al. |
| 5,293,730 A | 3/1994 | Bich et al. |
| 5,340,972 A | 8/1994 | Sandor |
| D366,037 S | 1/1996 | Kawauchi et al. |
| 5,657,012 A | 8/1997 | Tait |
| 5,772,149 A | 6/1998 | Butterworth |
| 5,820,064 A | 10/1998 | Butterworth |
| 5,844,634 A | 12/1998 | Stacy |
| 5,857,028 A | 1/1999 | Frieling |
| 6,000,657 A | 12/1999 | Butterworth |
| 6,118,236 A | 9/2000 | Shaw et al. |
| D438,846 S | 3/2001 | Bonn |
| 6,278,443 B1 | 8/2001 | Amro et al. |
| 6,292,783 B1 * | 9/2001 | Rohler .............. G06F 17/30587 705/2 |
| 6,361,447 B1 | 3/2002 | Lindstrom |
| 6,608,648 B1 | 8/2003 | Bean |
| 6,638,116 B2 | 10/2003 | Byron et al. |
| 6,658,669 B1 | 12/2003 | Addington et al. |
| 6,660,042 B1 | 12/2003 | Curcie et al. |
| 6,967,596 B2 | 11/2005 | Nguyen |
| 7,109,970 B1 | 9/2006 | Miller |
| 7,248,202 B2 | 7/2007 | Teng et al. |
| 7,264,553 B1 | 9/2007 | Addington et al. |
| 7,298,362 B2 | 11/2007 | Wang |
| 7,321,360 B1 * | 1/2008 | Goren ...................... G06F 3/014 341/20 |
| 7,374,489 B2 | 5/2008 | Sexton |
| 7,446,755 B1 * | 11/2008 | Goren ...................... G06F 3/014 345/161 |
| 7,548,231 B1 * | 6/2009 | Goren ...................... G06F 3/014 341/20 |
| 7,565,295 B1 * | 7/2009 | Hernandez-Rebollar ............ G06K 9/00355 382/182 |
| 7,898,527 B1 * | 3/2011 | Goren ...................... G06F 3/014 345/168 |

(Continued)

*Primary Examiner* — Edgar Guerra-Erazo
(74) *Attorney, Agent, or Firm* — Heimlich Law, PC; Alan Heimlich, Esq.

(57) ABSTRACT

A system that allows a vehicle operator to record and send a voice message without ever releasing their hands from the wheel and taking their eyes off the road is disclosed. This system also allows incoming notification of messages to be read out loud to the user if they choose. The recipient, if not driving, can choose to see a transcription of the voice message, otherwise the recorded message is played back as recorded by a sending user.

16 Claims, 14 Drawing Sheets

(56) References Cited

U.S. PATENT DOCUMENTS

| | | |
|---|---|---|
| 7,917,235 B2 | 3/2011 | Miller |
| 7,941,118 B2 | 5/2011 | Catreux et al. |
| 8,049,718 B2 * | 11/2011 | Goren .................... G06F 3/014 345/156 |
| 8,140,339 B2 * | 3/2012 | Hernandez-Rebollar ............ G06K 9/00355 382/182 |
| 8,169,414 B2 | 5/2012 | Lim |
| 8,345,014 B2 | 1/2013 | Lim |
| 8,346,393 B2 | 1/2013 | Kim et al. |
| 8,358,815 B2 | 1/2013 | Benkley et al. |
| 8,386,060 B2 | 2/2013 | Miller |
| D687,039 S | 7/2013 | Wyers |
| 8,477,111 B2 | 7/2013 | Lim |
| 8,542,209 B2 | 9/2013 | Lim |
| 8,605,036 B1 | 12/2013 | Kelly |
| 2002/0087319 A1 * | 7/2002 | Stephenson ............ G10L 15/26 704/270 |
| 2008/0140408 A1 * | 6/2008 | Basir .................... H04L 12/1859 704/260 |
| 2010/0137037 A1 * | 6/2010 | Basir .................... H04M 1/6091 455/569.1 |
| 2010/0305807 A1 * | 12/2010 | Basir .................... B60R 16/0373 701/31.4 |
| 2013/0021176 A1 * | 1/2013 | Tu ........................ H04W 4/027 340/994 |
| 2013/0117021 A1 * | 5/2013 | James .................. G01C 21/362 704/235 |

* cited by examiner

METHOD AND APPARATUS FOR SAFELY AND RELIABLY SENDING AND RECEIVING MESSAGES WHILE OPERATING A MOTOR VEHICLE

RELATED APPLICATION

The present Application for Patent is related to pending U.S. patent application Ser. No. 14/145,770 titled "Method and Apparatus for In-Car Communication Device" which is hereby incorporated herein by reference.

FIELD OF THE INVENTION

The present invention pertains to a communication device. More particularly, the present invention relates to Method and Apparatus for Safely and Reliably Sending and Receiving Messages While Operating a Motor Vehicle.

BACKGROUND OF THE INVENTION

The ease and simplicity associated with sending short text messages (SMS) over cellular and WiFi networks combined with the proliferation of smart devices has created a notable safety issue for motor vehicle operators using this technology. The process, which involves, but is not limited to, reading an incoming message, selecting a contact to address, typing of the message and possibly reading it over, is very distracting to the driver. The sequence of actions involves releasing one or both hands from the steering wheel and taking eyes away from the road—not to mention the distracted attention span.

Distracted driving is a major cause of death/injury. In fact, in some instances it is so prevalent that acronyms exist for the condition. For example, DWT denotes driving while texting which is a major problem. Some states have outlawed DWT. Statistics from the United States Department of Transportation National Highway Traffic Safety Administration (NHTSA) (e.g. http://www.distraction.gov/content/get-the-facts/facts-and-statistics.html) indicate thousands of people die each year and hundreds of thousands are injured. For young drivers, over 20 percent of the accidents are due to distracted driving while using a phone. This presents a technical problem for which a technical solution using a technical means is needed.

BRIEF DESCRIPTION OF THE DRAWINGS

The invention is illustrated by way of example and not limitation in the figures of the accompanying drawings.

DETAILED DESCRIPTION

In one embodiment of the invention, a technique is disclosed that allows a vehicle operator, such as, but not limited to a motor vehicle operator, to record and send a voice message without ever releasing their hands from the wheel or taking their eyes off the road (or waterway) ahead.

In one embodiment the system disclosed will also allow incoming notification of messages to be read out loud to the user if they choose to. The recipient, depending on whether they are driving or not, can choose to see a transcription of the voice message or hear the message as recorded by the sending person.

In one embodiment of the invention, the recipient, depending on whether they are driving or not, can choose to see a transcription of the voice message or hear the message as recorded by a sending vehicle driver. In one embodiment of the invention a vehicle to vehicle communication is possible.

In some embodiments of the invention in order to provide safe and reliable operation and minimize the distracted driver problem limitations and/or constraints are placed on the invention. Some of these limitations and/or constraints are for example, but not limited to:

1) Limiting the number of contacts the operator of the vehicle can start a messaging thread with; and 2) Ensuring that any added contacts have a distinct phonetic build up to their names to avoid ambiguous recognition which might lead to sending a message to a wrong party or distraction of the driver.

In various embodiments of the invention the following are but a few of the scenarios possible.

1. Starting a new message thread while driving (e.g. FIG. 11)

2. Reading and/or replying to a message while driving (e.g. FIG. 12).

3. Composing/reading/replying a message while stationary (e.g. FIG. 13).

Figure 13:
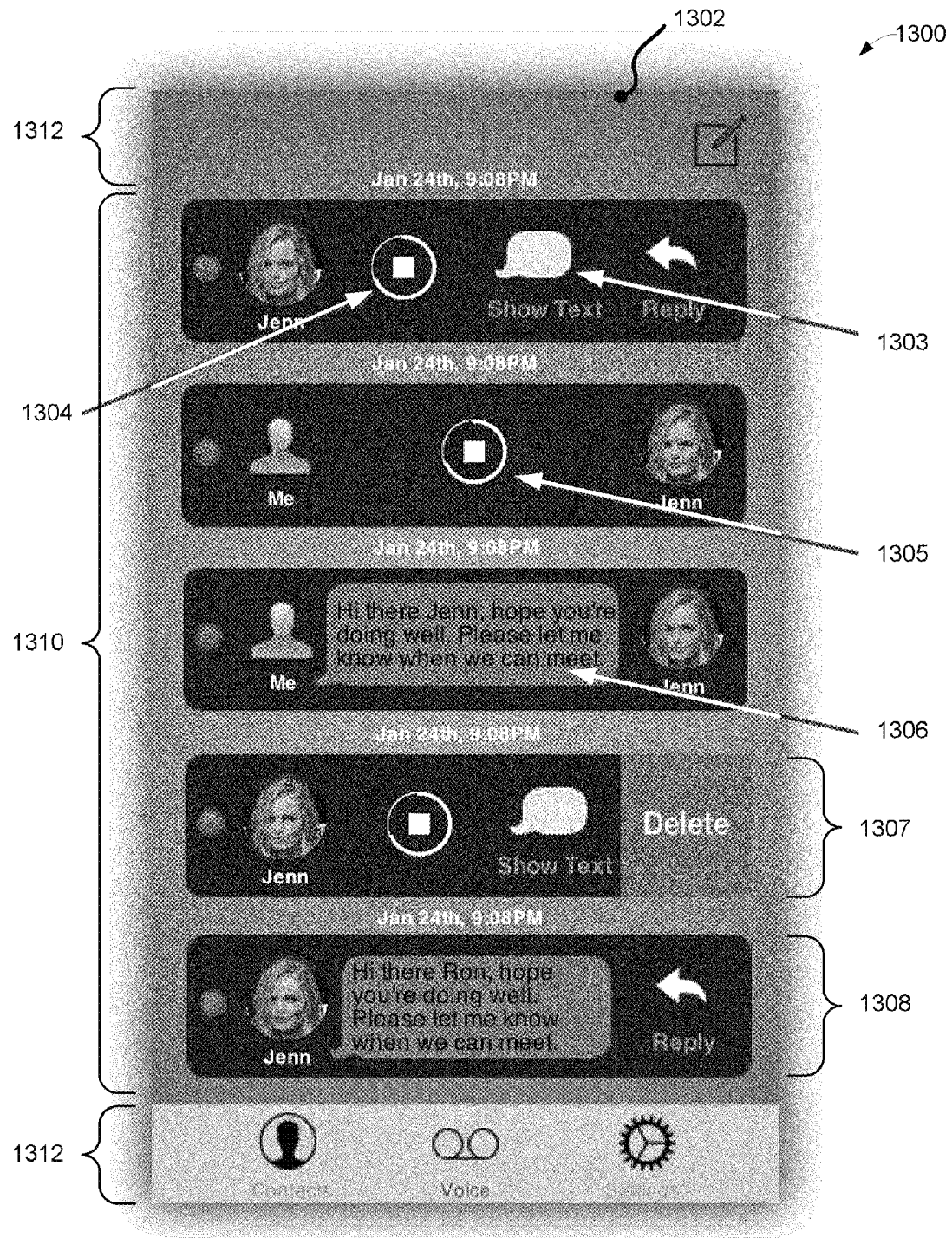
FIG. 13 illustrates one embodiment of the invention showing a flow chart for reading, replying, and composing message while not driving.

In one embodiment of the invention, while the user is stationary the stationary user is awarded the luxury of transcribing the voice message as opposed to burdening the driver with perfecting the dictation of the message (e.g. FIG. 13 at 1303 on device 1302).

In one embodiment of the invention, in the event that the transcription does not make sense, the stationary user can always fall back to listening to the actual recorded voice message (e.g. FIG. 13 at 1304 on device 1302).

In one embodiment of the invention, the stationary user is able to send a voice message to the vehicle operator. In this case, the message is played back to the vehicle operator as recorded (e.g. FIG. 13 at 1305).

In one embodiment of the invention, the stationary user also has the luxury of sending a typed message to the vehicle operator (e.g. FIG. 13 at 1306). In this case, the message is speech synthesized and read out loud to the vehicle operator.

In one embodiment the invention allows a vehicle operator to record and send a voice message without ever releasing their hands from the wheel and taking their eyes off the road. In one embodiment the invention will also allow incoming notification of messages to be read out loud to the user if they choose. In one embodiment of the invention, the recipient, if not driving, can choose to see a transcription of the voice message, otherwise the recorded message is played back as recorded by the sending user.

In one embodiment the invention allows a vehicle operator to record any incoming messages which can be played while recording or played back later at the vehicle operator's command. In one embodiment the invention automatically records incoming messages, prompts the vehicle operator with information about the message sender, and allows the vehicle operator to play back any messages recorded in any desired sequence.

In one embodiment of the invention, when the vehicle is within proximity of another vehicle, a vehicle to vehicle (direct or via towers) communication is possible. For example, if vehicle 1 is in front of vehicle 2, and the vehicle 2 operator notices that vehicle 1 has a low tire, then vehicle 2 operator may, for example, send a message to vehicle 1 about the low tire situation. In one embodiment of the invention based on a license plate number one vehicle operator may send another vehicle operator a message. This vehicle within proximity to another vehicle communication in one embodiment may be effected using existing infrastructure, for example, existing cell towers. In another embodiment this vehicle within proximity to another vehicle communication may be effected directly from vehicle to vehicle, for example, by using WiFi from one vehicle to the other vehicle. However, the invention is not so limited and other communication links may be used, for example, but not limited to, longer range bluetooth, ZigBee, etc.

Applicant is the lexicographer and has defined a series of terms, including but not limited to, "figsig" and "figsigs". Please see also incorporated reference U.S. patent application Ser. No. 14/145,770 titled "Method and Apparatus for In-Car Communication Device" for a full definition of terms.

In one embodiment of the invention, as an in-car communication device, which is primarily placed on the steering wheel column (e.g. in front of the instrument cluster directly facing the driver), it pairs with a handset's bluetooth link.

In one embodiment of the invention, the device facilitates safe, reliable and intelligible communication with other remote users or computing device(s). The communication comprises of, but is not limited to, speech recognition for text messaging and information retrieval and high fidelity voice communications.

In one embodiment of the invention, the communication functions are enabled by a sophisticated steerable microphone beam forming array using multiple beams that minimize ambient noise pickup.

In one embodiment of the invention, user control of the device is accomplished using gestures and taps. The gestures are triggered when the finger(s) of either or both hands are extended while both hands remain placed on the steering wheel at all times.

In one embodiment of the invention, a miniature display is utilized to aid in iconic display of notifications/events/status or customization of content based on user preferences. The information is then delivered using text to speech technology using a built in speaker or various other audio links.

Figure 3:
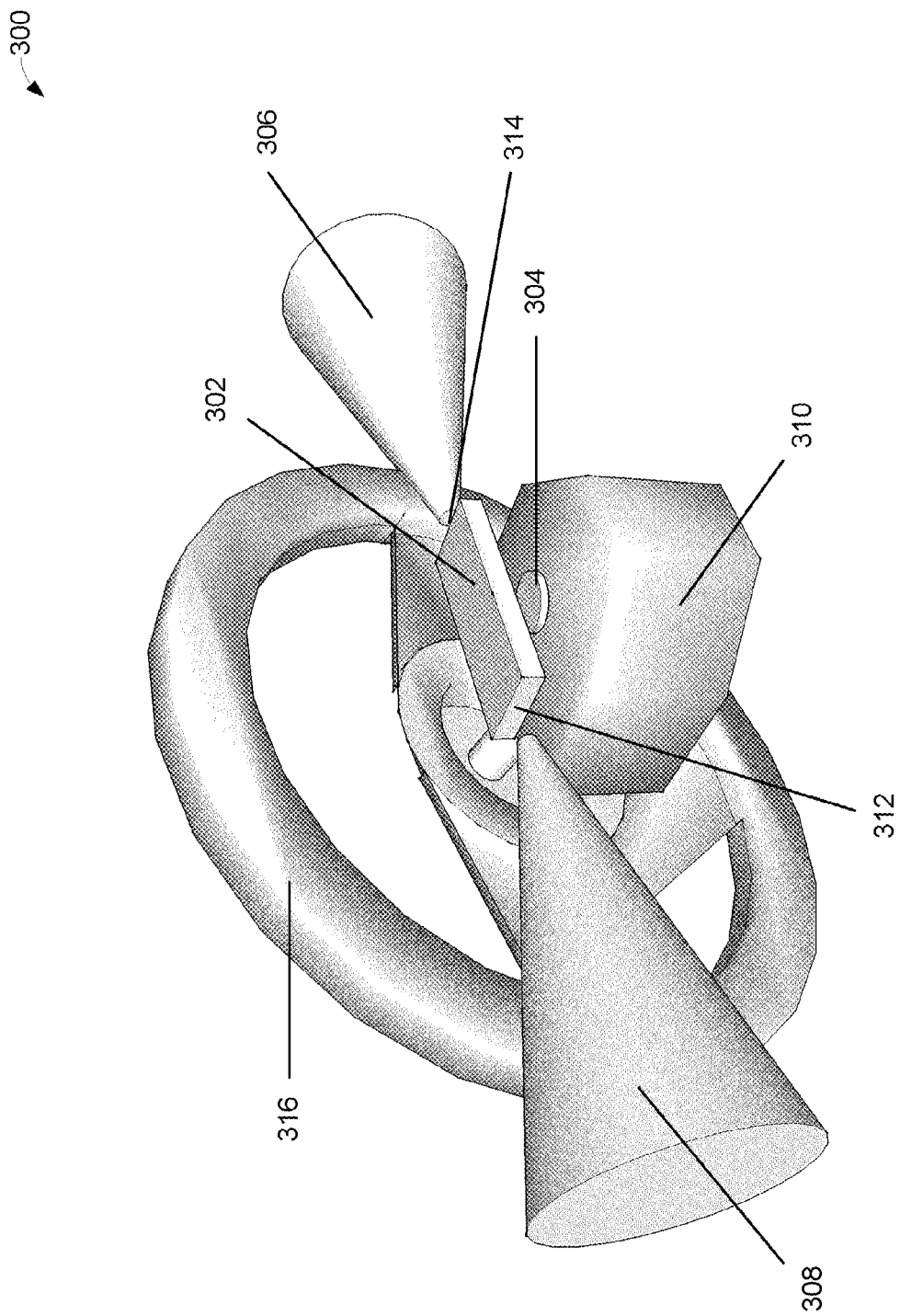
FIG. 3 illustrates one embodiment of the invention, shown from a dash-board view.

FIG. 3 illustrates, generally at 300, one embodiment of the invention. The device 302 is placed on the steering wheel column or steering wheel cowling 310. A ferromagnetic element 304 is affixed to the steering wheel column 310 (using for example, a double sided adhesive. Device 302 has a speaker and by using the speaker's magnet in 302 (or another ferromagnetic material in 302), the device 304 securely mounts to the ferromagnetic base 304.

In one embodiment of the invention the ferromagnetic element 304 may not be needed if the steering wheel cowling 310 has a ferromagnetic element that allows device 302 to attach using the ferromagnetic element or speaker magnet in device 302.

In one embodiment of the invention, the device, for example 302 in FIG. 3, can easily detach for in home charging or portability to another location.

The device 302, in one embodiment, is outfitted with infrared emitting diodes on each side of the device 302 as shown at 312 and 314 and a compatible receiver. The receiver, in one embodiment, measures the reflectivity count of any object that perturbs the diodes field of view illustrated here as cones 306 and 308 which are emanating from device 302, and as such is used to detect the hand gestures on either or both sides of the steering wheel 316.

In one embodiment of the invention the diodes and receiver are masked with optical lenses located for example at positions 312 and 314 that aid in expanding the field of view (e.g. cones 306 and 308) of the infrared diodes and the receiver.

In one embodiment of the invention, the pattern of the gestures understood by the device 302 are fully configurable by the user using, for example, a smartphone application (app) and the user can choose to map these different gestures to various functions in the car.

Figure 5:
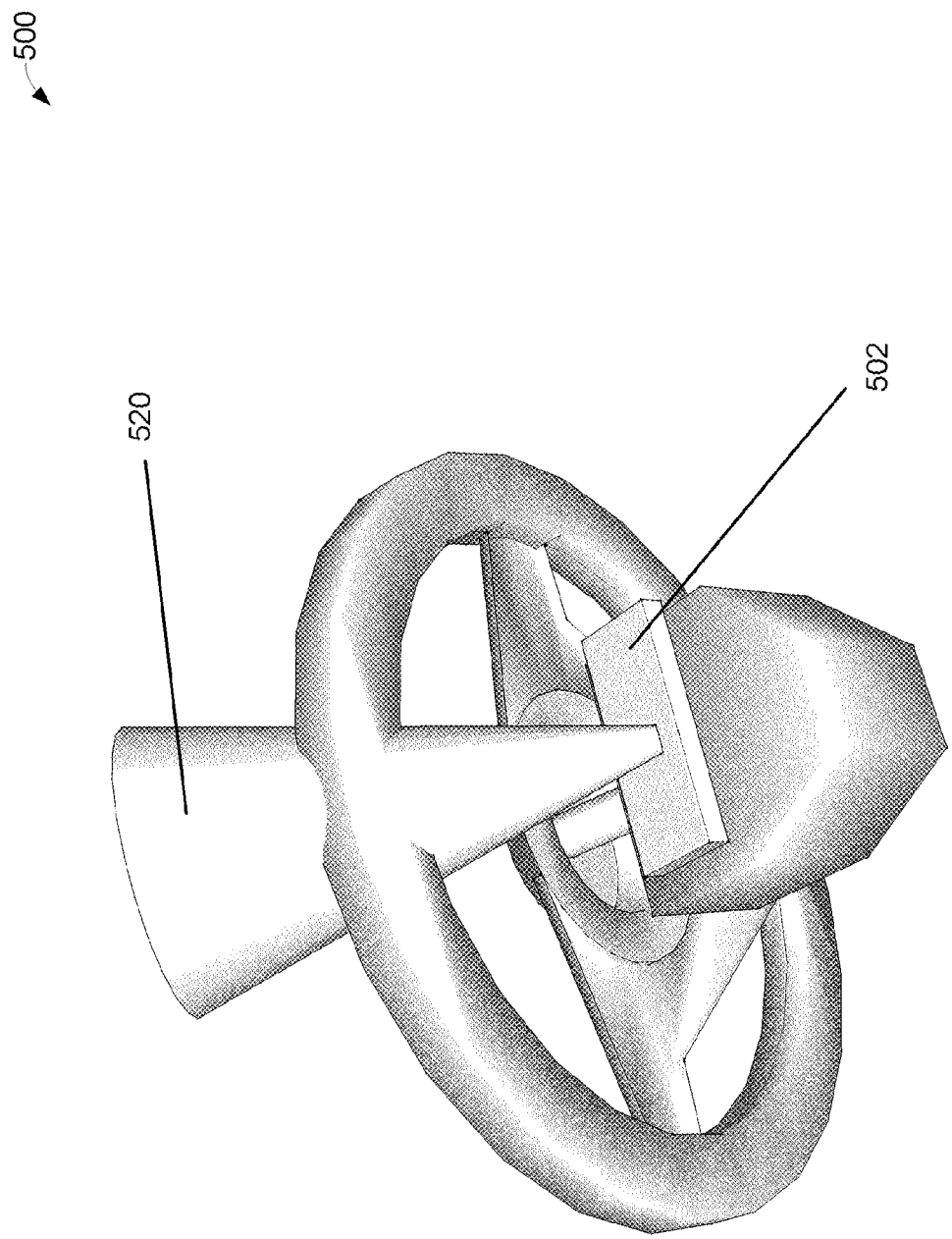
FIG. 5 illustrates one embodiment of the invention, showing a voice pickup pattern.

In one embodiment of the invention, the device 502 has a steerable microphone array for higher sensitivity towards the driver and another beam with higher sensitivity towards a passenger or otherwise in the cabin as may be seen in FIG. 5. The beams are fully configurable using a smartphone app by the user.

Figure 6:
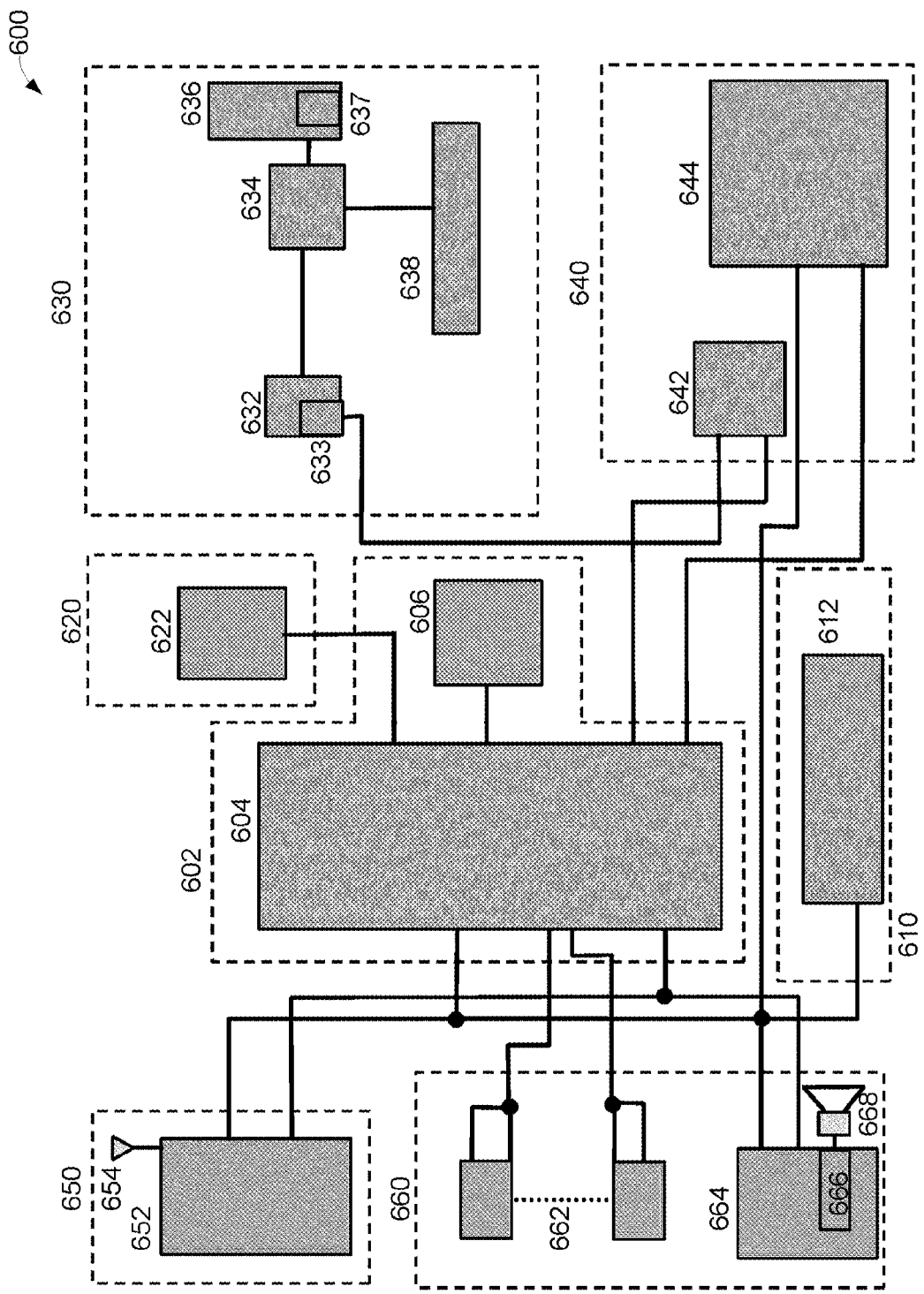
FIG. 6 illustrates one embodiment of the invention, shown in block diagram form.

In one embodiment, the device, for example 302 in FIG. 3, incorporates a motion sensor such as that shown in FIG. 6 at 642. The motion sensor aids in detecting when the car is in motion, whether it is at rest in the car or on the move (such as anti-theft measures). Most notably, the motion sensor is able to sense a shock (a tap) from the user to reflect different gestures. For example, a single tap while the device is outputting audio could reflect a mute gesture or a snooze function. When the device is in deep sleep to conserve power consumption, a single tap could mean to wakeup the device.

In one embodiment, the device, for example 302 in FIG. 3, incorporates aggressive power saving measures as outlined and shown for example in FIG. 6 at 642. If no motion is detected for a set period of time (T), the power switch as seen, for example, in FIG. 6 at block 632 turns all power to peripherals (such as for example 620, 650, 660, and 610) in FIG. 6 off. The only current leakage at this point would be from the "always on" motion sensor while it awaits a wakeup signal which is a preset vibration threshold in any of its 3 axes.

Figure 4:
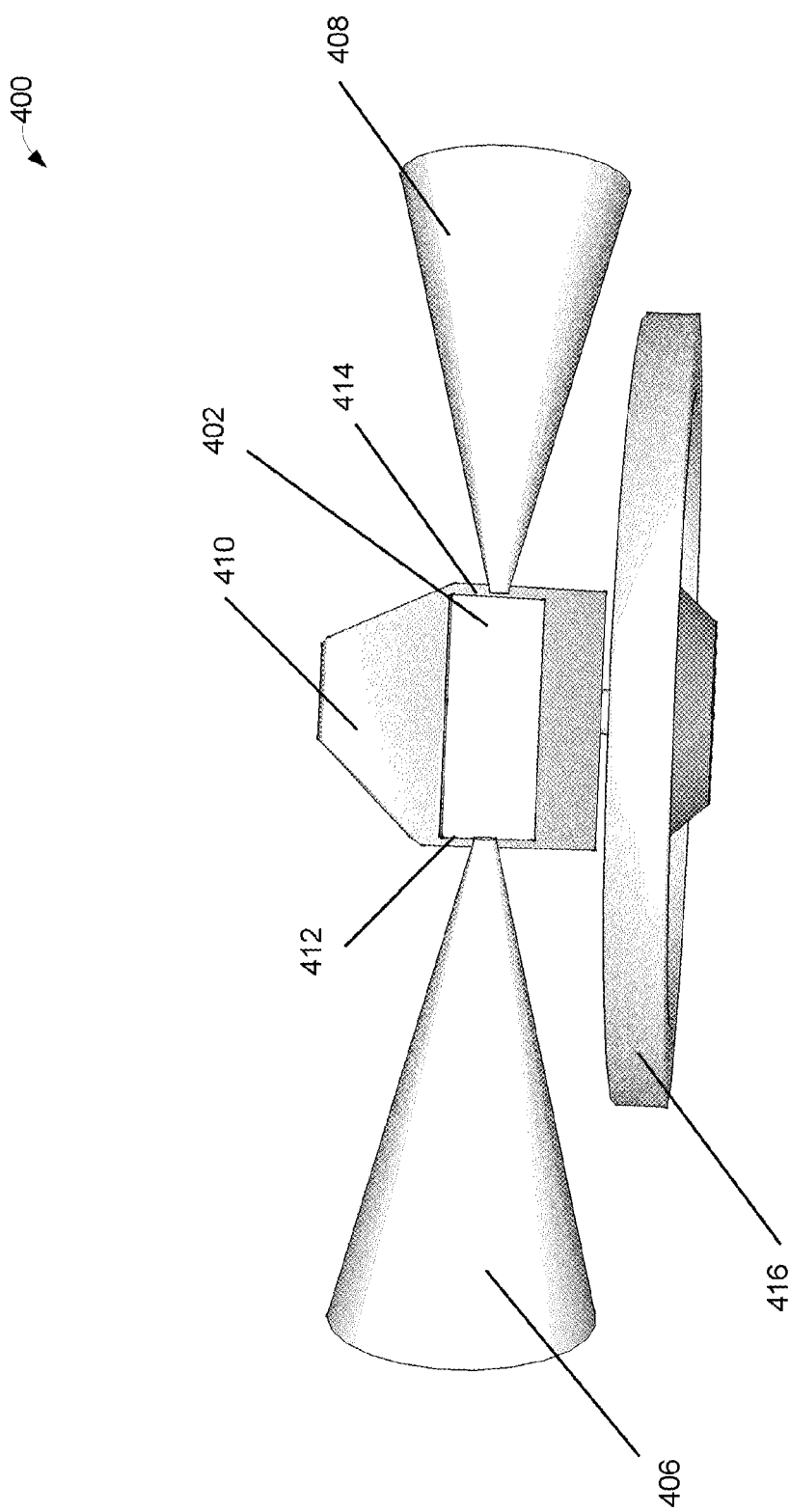
FIG. 4 illustrates one embodiment of the invention, shown looking down on a steering cowling.

FIG. 4 illustrates, generally at 400, one embodiment of the invention. Shown here is a top view of the device 402 mounted on a steering column 410. Device 402 has two ends 412 and 414 from which emanate sensing beacons 406 and 408 respectively, which can sense when a user's fingers on steering wheel 416 extend into sensing beacons 406 and/or 408. Also in device 402 is a sound pickup system to detect finger tapping, voice commands, etc. Additionally device 402 may have a motion and/or acceleration sensor for sensing a user's finger(s) movement.

FIG. 5 illustrates, generally at 500, one embodiment of the invention. Device 502 has a microphone array and as shown here is a pickup pattern 520 which is aimed in the direction where a driver's mouth might be located. Not shown in FIG. 5 are the capacitive and/or IR fields (such as shown for example in FIG. 4 at 406 and 408) for gesture recognition. While pickup pattern 520 is shown as a single beam the invention is not so limited and multiple beams may be formed. For example in one embodiment there is a beam for the driver and another aimed at a passenger.

FIG. 6 illustrates, generally at 600, one embodiment of the invention. At block 600 is a host processor 604 and flash 606. At block 610 is a display 612. At block 620 is a bluetooth 622. At block 630 is power management and battery charging circuitry where sub-block 632 has an enable section 633, 634 is a USB (Universal Serial Bus) battery charger, 636 is a USB block having a sub-block 637 D+, block 638 is a battery. At block 640 is a motion sense unit 642, and at 644 is a hand gesture recognition unit (for both left and right). At block 650 is a FM (frequency modulation) transmitter and at 654 an FM antenna. At block 660 is an array of microphones 662, at 664 an amplifier, at 66 an analog section, and at 668 a speaker.

Figure 7:
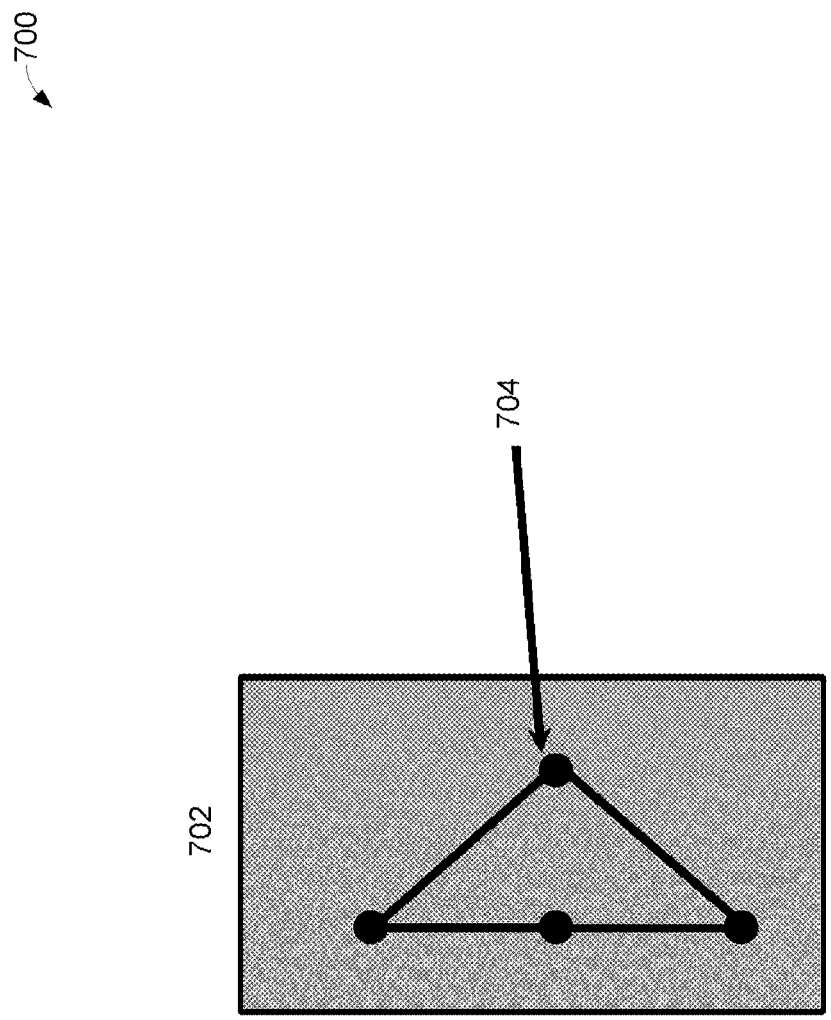
FIG. 7 illustrates one embodiment of the invention, showing microphones.

FIG. 7 illustrates, generally at 700, one embodiment of the invention. Device 702 is shown with 4 microphones (signified by the dots) and arranged in a triangular pattern 704. However the invention is not so limited and any number of microphones may be used. What is to be appreciated is that larger numbers of microphones allow more sophisticated and higher order beamforming.

Gestures and fingering as defined herein (also defined and denoted as "figsigs") is gesturing with any part of the human anatomy, including but not limited to, one or more fingers, hands, arms, digits, phalanges, the head, or any combination thereof which in one or more possible combination are a signaling. Gesturing may be silent or may generate a sound. Both gesturing with silence and sound and a combination may be used for signaling.

For example in one embodiment of the invention figsigs may be predefined, such as but not limited to, the left hand pinky moving in and out as signaling that the volume of an audio source in the vehicle should be lowered.

For example in one embodiment of the invention figsigs may be predefined, such as but not limited to, the left hand index finger moving in and out as signaling that the volume of an audio source in the vehicle should be raised.

For example in one embodiment of the invention figsigs may be predefined, such as but not limited to, the right hand index finger being extended signaling that doors in the vehicle should be locked.

For example in one embodiment of the invention fingering may be predefined, such as but not limited to, one of the hands opening and closing twice within 2 seconds as signaling that the audio pickup pattern of the invention should be directed toward the hand direction. For example in the instance where the driver side is on the left side of the vehicle and the passenger side is the right side of the vehicle, then the right hand opening and closing twice within 2 seconds would indicate that the audio pickup pattern of the invention should be directed toward the passenger side. "figsigs" are context dependent. For example, during music playback, a left figsig could gesture changing to the previous track and a right figsig could gesture changing to the next track. In a voice call, left or right figsigs could signal the driver's intention to enable and point another voice beam independent of the driver's to a front passenger. Continuous figsigs in this mode could further signal rotation of the secondary beam(s) in the 360° horizontal axis.

In other embodiments of the invention the fingering is not predefined and may be defined by the user. For example, in one embodiment of the invention, the user may put the product into a learn mode, where for example, the top two fingers of the right hand being extended may be used to indicate that a call should be placed to a preprogrammed telephone number, for example, an office or a home. Once the call is being placed the fingers may be returned to the steering wheel, a conversation conducted, and when the top two fingers of the right hand being extended again would indicate to disconnect the phone connection.

While embodiments of the invention have been illustrated as residing on a top surface of a steering column or steering cowling, the invention is not so limited. For example, while a top mounted embodiment may be able to detect hands placed at a 10 o'clock and 2 o'clock position or even anywhere from 9 to 3, if the hands are in a 4 o'clock and 8 o'clock position a unit may be mounted on the underside of the steering column or steering cowl (to detect even a 3 to 9 o'clock positioning of the hands).

Nor is the invention limited to mounting on the steering column or cowling. For example embodiments of the invention may be located on the dash panel.

Nor is the invention limited to infrared detection, as radio frequency, capacitive, or even optical (e.g. cameras) may be used. For example, 2 or more cameras may be used to detect figsigs.

While the description above has described embodiments of the invention where the figsigs are primarily combinations of finger movements the invention is not so limited. In one embodiment of the invention microphones are able to detect sounds, for example, tapping sounds on a steering wheel. These sounds in combination with the finger movements may be used for signaling. For example, a right index finger extending 3 times in a row in a pre-specified time interval accompanied by 3 tapping sounds might be used by a teenager user to phone the teenager's parents via a bluetooth connection to the teenager's smartphone in the vehicle and speak or leave a voice message or text message that they are on their way home and expect to arrive within say 15 minutes. Or the teenager may pre-record a message that is delivered.

While the invention has been described above for use in a vehicle, the invention is not so limited and the device or unit may be removed and carried with the user for use elsewhere. For example, the unit may be used as a high fidelity voice conferencing unit or as a high fidelity microphone device when plugged into a computer for the purpose of charging.

Embodiments of the invention may be powered by direct connection to an electrical supply, for example via a cord, a set of mating contacts with a receptacle, etc. Embodiments of the invention may also be powered by inductive means, etc.

Embodiments of the invention may be powered only or may have batteries or a combination.

Embodiments of the invention may be attached/mounted to structures with magnetic means, such as magnets and ferrous materials, Velcro® or like materials, straps, snaps (like jacket metal snaps), sliding into an enclosure (like a charging station), etc. if removal is desired. Permanent mounting is also possible.

While embodiments of the invention have been described as using figsigs to effect other devices the invention is not so limited. For example, in one embodiment the invention may sense when one or more hands are not in contact with a steering wheel while a vehicle is in motion and may issue a verbal warning such as "hands on the wheel-please". Other embodiments using the microphone for example may sense wind noise, engine RPM, etc. and issue warnings. Other embodiments may sense motion, acceleration, etc. and issues warnings. One embodiment may sense not only collision but inversion of a vehicle and send the results to a remote location using wireless technology. Other embodiments may sense when a user has stepped away from a parked device but has left behind their linked smartphone. In such cases, the device may sound an alarm to remind the user to come back and take along their smartphone. Sensing a parked device can occur using a fusion of the microphone, motion, and IR sensors.

In one embodiment of the invention the finger gestures (fingering) (figsigs) is combined with external events to provide signaling. For example, in one embodiment, the invention can detect acceleration and deceleration. In one embodiment the invention might sense that the user's hands are gripping the steering wheel and not signaling and there is a rapid unusual deceleration indicating a possible panic stop. Under such a situation the audio volume may be muted or lowered. Going further with the example, if the invention then detects an impact, for example, from a crash it might automatically call the police, fire, etc. and possibly report the vehicle's position using GPS information. The invention may sense that the airbags are deploying, indicating a crash, and shut off the running engine and unlock the vehicle doors. What is to be appreciated is that the device by sensing user interactions coupled with external events that it can detect can implement intelligent responses.

For example, in one embodiment of the invention, the microphone(s) can sense engine noise. An increase in engine noise due to higher engine revolutions per minute can be used to adjust dynamically, for example, the volume of an ongoing phone conversation.

In one embodiment of the invention, for example, the motion sensor might detect that the vehicle is not in motion and that the engine has stopped. This might be used to trigger a call, for example, home to play a message that the vehicle driver has arrived at a destination.

Below is a limited example of figsigs.

| FIGSIGS | Current state | Command |
| --- | --- | --- |
| Right index flexing | Radio off | Turn radio on |
| Right index flexing | Radio on | Radio volume up |
| Left index flexing | Radio on | Radio volume down |
| Right index flexing + Left index flexing at the same time | Radio on | Turn radio off |
| Left index flexing | Radio on | Radio volume down |
| Right middle flexing | Radio on | Change audio source (or radio station) |
| Left index flexing + Left middle flexing at the same time | Left turn signal off | Left turn signal on |
| Left index flexing + Left middle flexing at the same time | Left turn signal on | Left turn signal off |
| Right index flexing + Right middle flexing at the same time | Right turn signal off | Right turn signal on |
| Right index flexing + Right middle flexing at the same time | Right turn signal on | Right turn signal off |
| Left middle flexing + Left ring flexing + Left pinking flexing at the same time | Telephone off | Call home |
| All fingers on left hand flexing + All fingers on right hand at the same time | Don't care state. | Call Emergency services. |
| Right index flexing + Right middle + Right ring flexing at the same time | Don't' care | Turn on voice commands to, for example, send or read text messages. |
| Right index flexing + Right middle + Right ring flexing at the same time | Voice commands off. | Turn on voice commands to, for example, send or read text messages. |
| Right index flexing + Right middle + Right ring flexing at the same time | Voice commands on. | Turn off voice commands. |
| Right index flexing + Right pinky flexing at the same time | Don't care. | Turn microphone direction to the right. |
| Left index flexing + Left pinky flexing at the same time | Don't care. | Turn microphone direction to the left. |
| Right index flexing + Right pinky flexing Left index flexing + Left pinky flexing at the same time | Don't care. | Turn microphone direction to the driver. |
| Left index flexing + Right pinky flexing | Wipers off. | Turn on wipers. |
| Left index flexing + Right pinky flexing | Wipers on. | Turn wipers off. |

While the examples above have primarily indicated embodiments of the invention using figsigs alone, the invention is not so limited. For example, figsigs in combination with voice commands may be used to signal operational commands. For example, the Right index flexing+Right middle+Right ring flexing at the same time and speaking the command "high" and/or "low" might control the headlights in such a fashion that the driver need only say "high" or "low" to control the beams while maintaining full grip with both hands on a steering wheel. This is highly advantageous at night on a winding single lane country road with no lights in the rain and snow because the driver need not reach for any switch to control the headlights.

In one embodiment of the then as an in-car communication device, the device is primarily placed on the steering wheel column that pairs with a handset's bluetooth link. The device facilitates safe, reliable and intelligible communication and information retrieval with other remote users or computing device(s). A user controls the device via gestures and taps. The gestures are triggered when the finger(s) of either or both hands are extended while both hands remain placed on the steering wheel at all times.

Figure 8:
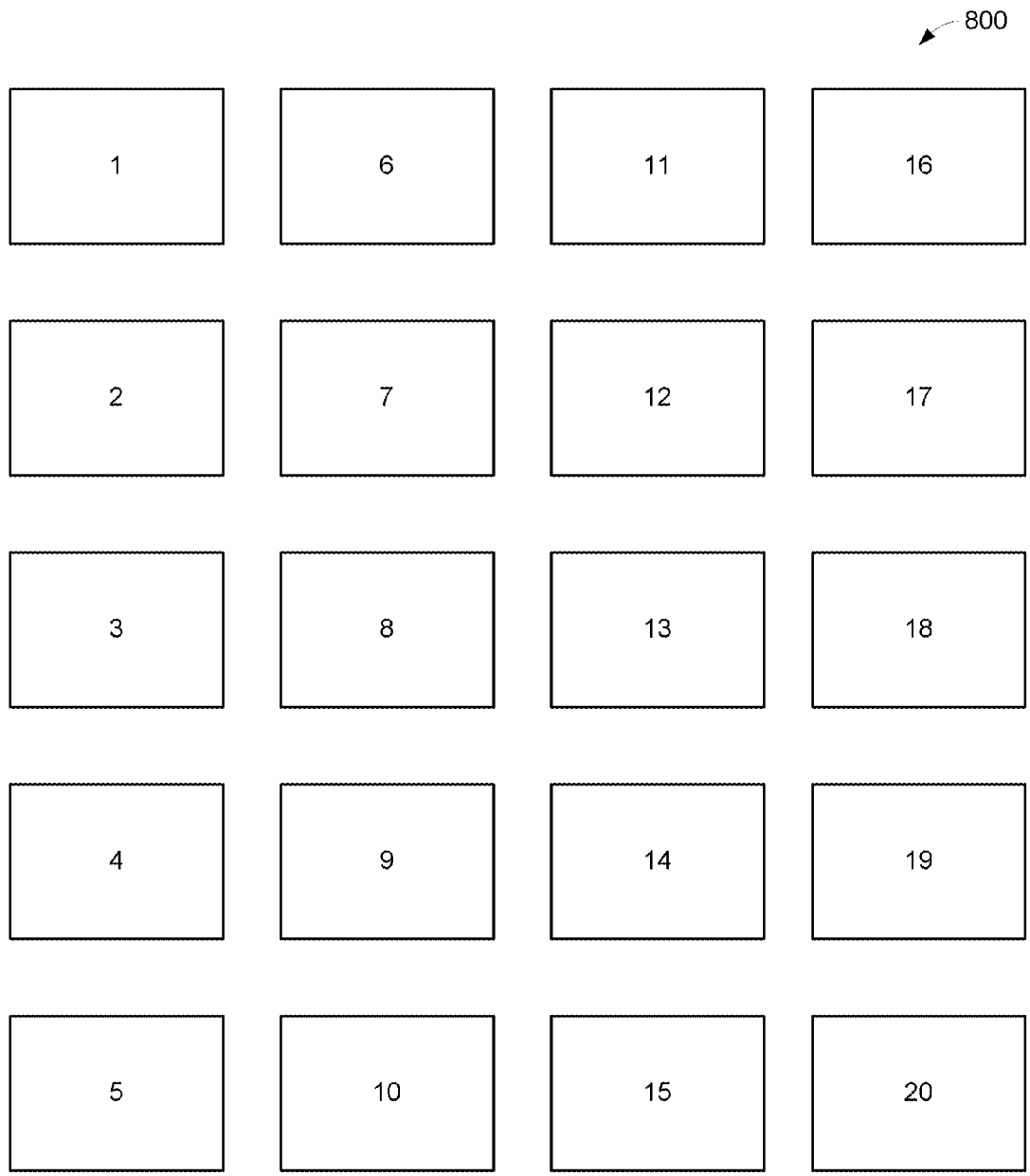
FIG. 8 illustrates various embodiments of the invention.

FIG. 8 illustrates various embodiments of the invention as indicated below.

Illustrated generally at 1. An apparatus comprising a figsigs sensing unit mounted on a steering wheel cowling.

Illustrated generally at 2. The apparatus of claim 1 wherein said mounted is removably mounted.

Illustrated generally at 3. The apparatus of claim 1 further comprising an electrical connection from said apparatus to an electrical power source in a vehicle where said steering wheel cowling is located.

Illustrated generally at 4. The apparatus of claim 1 wherein said figsigs sensing unit is in sensing communication with a steering wheel associated with said steering wheel cowling.

Illustrated generally at 5. The apparatus of claim 1 wherein said figsigs sensing unit further comprises a speaker having a magnetic voice coil assembly with an unshielded spider cage and wherein said mounted is effected between said magnetic voice coil assembly with an unshielded spider cage and a magnetic material attached to said steering wheel cowling.

Illustrated generally at 6. The apparatus of claim 1 wherein said figsigs sensing unit further comprises a magnetic material and wherein said mounted is effected between said magnetic material and a magnet attached to said steering wheel cowling.

Illustrated generally at 7. The apparatus of claim 1 wherein said figsigs sensing unit further comprises one or more magnets and wherein said mounted is effected between said one or more magnets and one or more magnetic materials in physical communication with said steering wheel cowling.

Illustrated generally at 8. The apparatus of claim 1 further comprising a steerable microphone array.

Illustrated generally at 9. The apparatus of claim 8 wherein said steerable microphone array as a result of a user command is steerable in a direction of a passenger in a vehicle having said steering wheel cowling.

Illustrated generally at 10. The apparatus of claim 9 wherein said user command is a voice command.

Illustrated generally at 11. The apparatus of claim 9 wherein said user command is a figsig.

Illustrated generally at 12. A method comprising: sensing a presence of a driver of a vehicle; sensing hand gestures from said driver wherein said hand gestures are a result of flexing of one or more fingers on said driver's one or more hands; and transforming said hand gestures into commands, said commands communicated to one or more other devices within said vehicle.

Illustrated generally at 13. The method of claim 12 further comprising sensing said vehicle in motion.

Illustrated generally at 14. The method of claim 12 wherein said one or more other devices is a smartphone.

Illustrated generally at 15. The method of claim 12 wherein said one or more other devices is a FM radio in said vehicle.

Illustrated generally at 16. The method of claim 12 wherein said one or more other devices are selected from the group consisting of a smartphone, a speaker, a radio, a display, a heads-up display, a link to said vehicle's on-board control system, a telemetrics unit, and any combination thereof.

Illustrated generally at 17. An apparatus comprising: a housing having one or more infrared transparent openings; one or more infrared emitters and one or more infrared receivers all mounted within said housing and proximate to said one or more infrared transparent openings and in operative communication with a control unit; and
wherein said housing is mounted on a steering wheel cowling in a vehicle such that said one or more infrared emitters and said one or more infrared receivers are adapted to sense one or more human fingers flexing when said human's one or more hands are situated on a steering wheel in said vehicle.

Illustrated generally at 18. The apparatus of claim 17 further comprising one or more microphones wherein said one or more microphones have an electronically steerable pickup pattern and are adapted to pick up sound from a human in said vehicle and are operatively coupled to said control unit.

Illustrated generally at 19. The apparatus of claim 18 further comprising a motion sensor unit wherein said motion sensor unit is operatively coupled to a power management unit and a battery charging circuit and wherein said sensor unit controls said power management unit which is operatively coupled to said one or more microphones, and operatively coupled to said control unit.

Illustrated generally at 20. The apparatus of claim 19 further comprising a hand gesture recognition unit, said hand gesture communication unit directly coupled to said one or more infrared emitters and said one or more infrared receivers and operatively coupled to said control unit.

Figure 9:
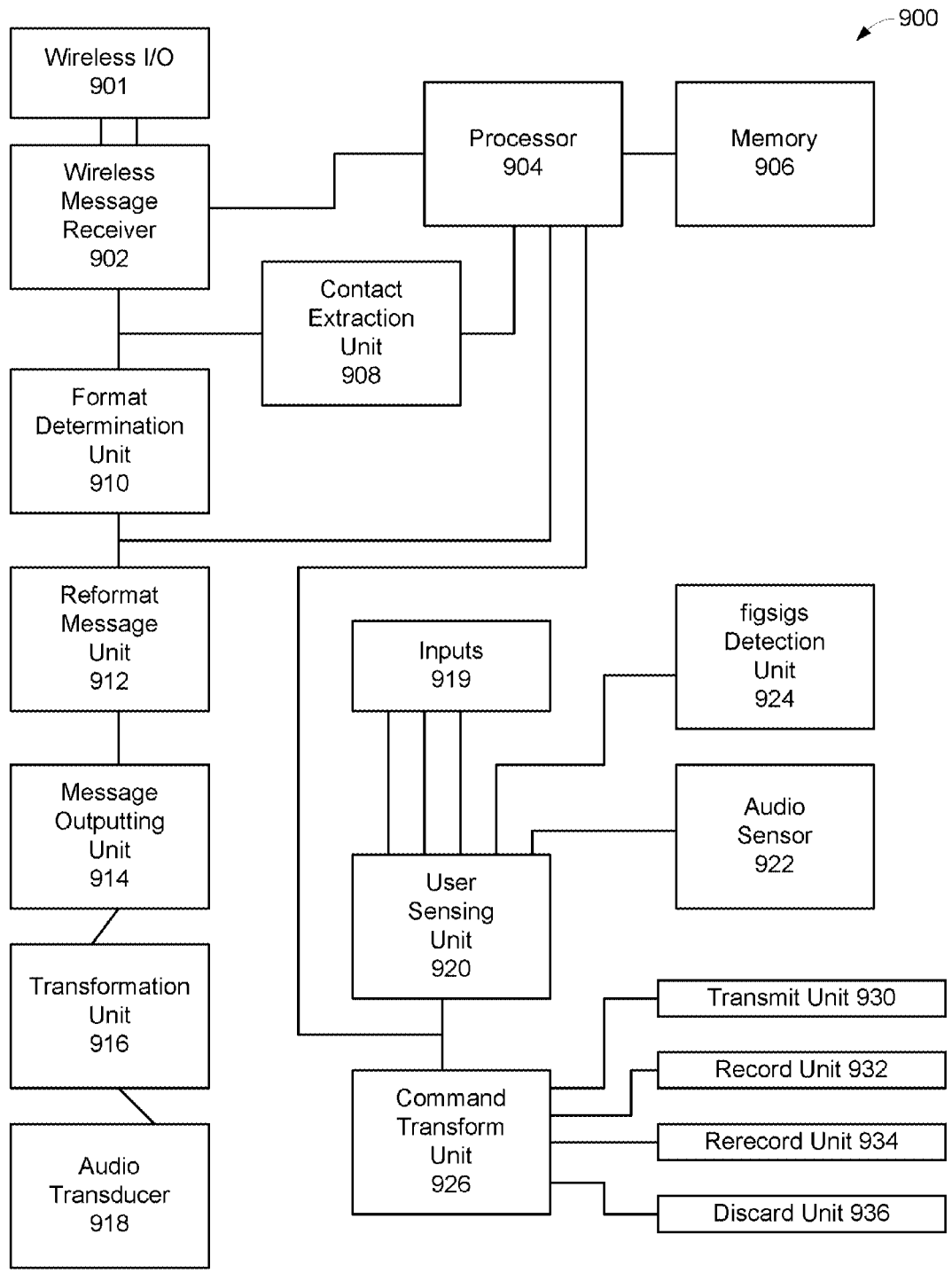
FIG. 9 illustrates one embodiment of the invention in block form.

FIG. 9 illustrates, generally at 900, one embodiment of the invention in block diagram form. At 901 is a wireless I/O module, at 902 a wireless message receiver, at 904 a processor, at 906 memory, at 908 a contact extraction unit, at 910 a format determination unit, at 912 a reformat message unit, at 914 a message outputting unit, at 916 a transformation unit, at 918 an audio transducer, at 919 input, at 920 a user sensing unit, at 922 an audio sensor, at 924 a figsigs detection unit, at 926 a command transform unit, at 930 a transmit unit, at 932 a rerecord unit, at 934 a rerecord unit, and at 936 a discard unit.

In one embodiment of the invention, for example, as illustrated partly in FIG. 9, wireless I/O 901 can be an antenna, receiver front end, a dish, etc. Wireless message receiver 902 can be a transceiver, a phone, a smartphone, a radar receiver, etc. Processor 904 because of the special requirements of the invention requires special hardware in the form of a barrel shifter. Preferably a 4 bit left shift barrel shifter or larger. Memory 906 is coupled to the specialized hardware based processor 904. Contact extraction unit 908 takes as input the output of the wireless message receiver 902 and has specialized hardware to examine the wireless message receiver 902 output and extract contact information and transform it into a format that is acceptable to processor 904 and send it to processor 904. For example, contact extraction unit 908 while performing its operations may filter and examine the wireless message receiver 902 output for matching entries stored in memory 906, or may be triggered by a particular data sequence in the wireless message receiver 902 output at which point the specialized hardware within the contact extraction unit will transform the particular data sequence in the wireless message receiver 902 output into a format acceptable to specialized processor 904. For example, but not limited to, transforming X bit values into X+M bit values where X is an integer greater than 4 and M is an integer greater than 0.

In one embodiment of the invention, format determination unit 910 can determine if a format supports a text or voice message. In one embodiment of the invention, reformat message unit 912 can transform text into speech. In one embodiment of the invention, reformat message unit 912 can transform speech into text. In one embodiment of the invention message outputting unit 914 can send a wireless signal. In one embodiment of the invention message outputting unit 914 can amplify a signal. In one embodiment of the invention, transformation unit 916 can take bits and convert them to a audio signal. In one embodiment of the invention, transformation unit 916 can take bits and convert them to a bluetooth signal. In one embodiment of the invention, audio transducer 918 can transform its input into for example, but not limited to, a bone sensing output, a haptics output, vibration of air molecules, etc.

In one embodiment of the invention inputs 919 can include, but are not limited to, voice, figsigs, sound, vibrations, tapping, etc. In one embodiment of the invention user sensing unit 920 receives the 919 inputs and relies on specialized sensor and detection units, such as but not limited to, figsigs detection unit 924, audio sensor 922. In one embodiment of the invention, user sensing unit outputs a command to command transform unit 926 which then can activate one or more units, for example, but not limited to, a transmit unit 930, a record unit 932, a rerecord unit 934, and a discard unit 936.

Figure 10:
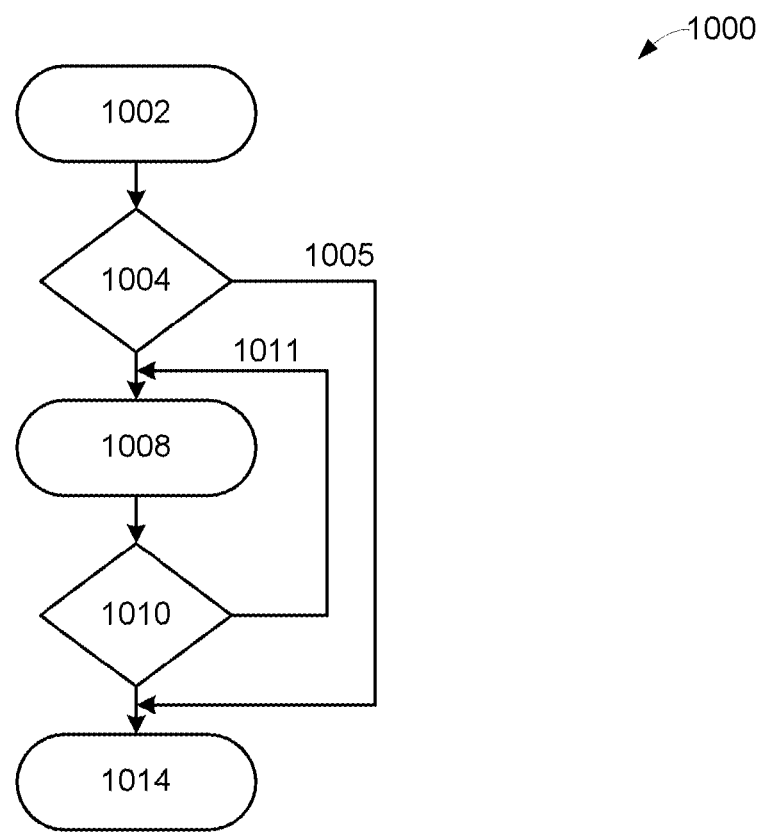
FIG. 10 illustrates one embodiment of the invention showing a flow chart for adding a message contact.

FIG. 10 illustrates, generally at 1000, one embodiment of the invention showing for example, adding a message contact. At 1002 an attempt to add a new messaging contact is started. At 1004 a determination is made if the maximum number of contacts has been reached. If the maximum number of contacts has been reached then via 1005 proceed to 1014. If the maximum number of contacts has not been reached then proceed to 1008. At 1008 a name is assigned to the contact and its spelling as it would be pronounced phonetically. At 1010 a determination is made if the newly added contact name sounds similar to any already added contacts and if yes then via 1011 proceed to 1008. For example at 1010 the double metaphone or the metaphone 3 algorithm or some other approach might be used to determine if the newly added contact name sounds similar to any already added contacts. If the newly added name does not sound similar to any already added contacts then proceed to 1014. At 1014 in this embodiment the adding of a new messaging contact is done. FIG. 10 illustrates a flow chart showing adding a contact in one embodiment.

Figure 11:
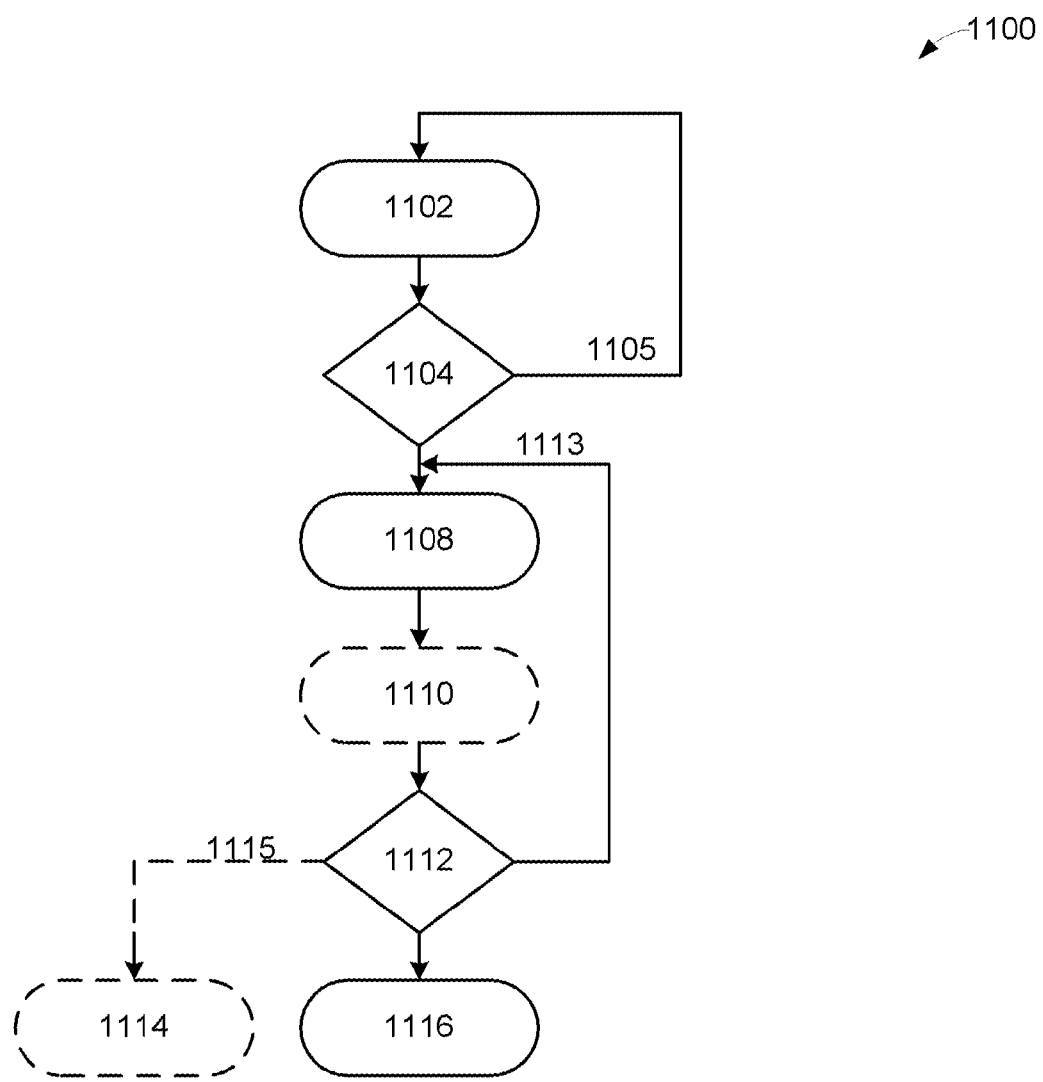
FIG. 11 illustrates one embodiment of the invention showing a flow chart for starting a new message thread while driving.

FIG. 11 illustrates, generally at 1100, one embodiment of the invention showing starting a new message thread while the user is driving. At 1102 voce recognition is activated and asks the user for the contact name. At 1104 a decision is made if the contact is recognized. If the contact is not recognized then via 1105 proceed to 1102. If the contact is recognized then at 1108 recording of the voice occurs. At 1110 which is optional, the recording may be played back. If optional 1110 is not present then proceed from 1108 directly to 1112. At 1112 a decision is rendered on whether to send the recorded message. If the decision is not to send the recorded message then proceed to 1108. If the decision is to send the recorded message then proceed to 1116 indicating the recorded message was sent and done.

In another embodiment of the invention, for example, as illustrated in FIG. 11 decision 1112 has an optional path of discarding or cancelling the sending of the message which follows 1115 to 1114 where the message is discarded.

Figure 12:
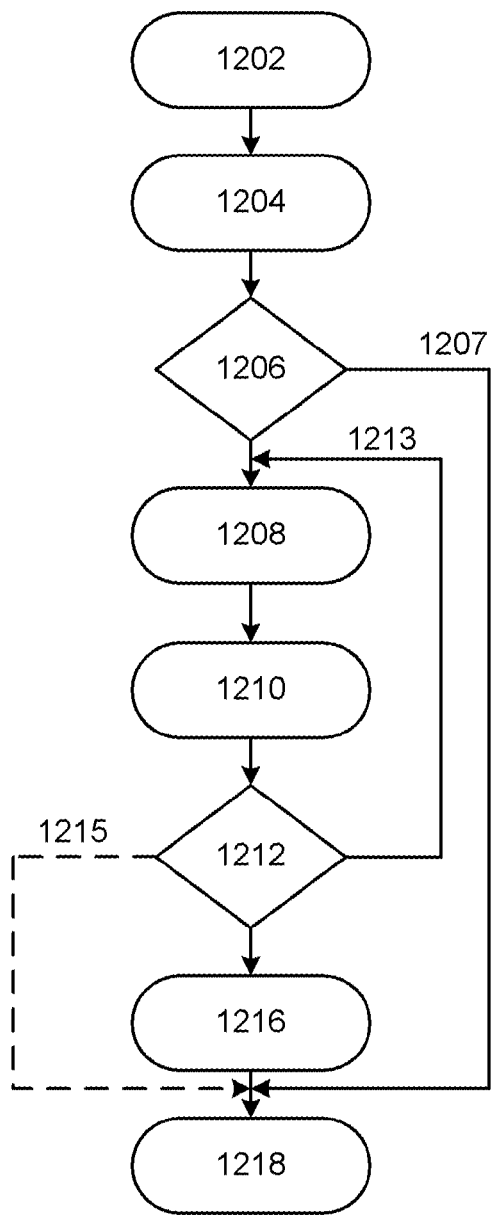
FIG. 12 illustrates various embodiments of the invention.

FIG. 12 illustrates, generally at 1200, one embodiment of the invention showing a reply to an incoming message while the user is driving. At 1202 contact information is extracted from the incoming message. At 1204 the message is read out to the driver. At 1206 the driver is asked if they want to respond to the message and if the answer is no then via 1207 proceed to done at 1218, otherwise at 1208 recording of the driver's message is performed. At 1210 is an optional playback of the message. At 1212 a decision to send the message is determined and if the decision is to not send the message than via 1213 proceed to 1208. If the message is to be sent then at 1216 the message is sent and proceed to 1218 done. In optional route 1215 the decision at 1212 is to cancel the message so via 1215 proceed to 1218 done.

FIG. 12 illustrates, generally at 1200, another one embodiment of the invention showing a reply to an incoming message while the user is driving. At 1202 an application on a smartphone extracts contact information from the incoming message. At 1204 the message is either speech synthesized and then read out to the driver or played back if it is a voice message. At 1206 the driver using figsigs, for example, but not limited to, using flicking of left/right hands and/or voice recognition asks the driver if they would like to respond to the message. If the driver does not want to respond to the message then via 1207 proceed to done at 1218, otherwise at 1208 record the driver's voice message. At 1210 is playback of the message. At 1212 a decision to send the message is determined and if the decision is to not send the message than via 1213 proceed to 1208. If the message is to be sent then at 1216 the message is sent and proceed to 1218 done. In optional route 1215 the decision at 1212 is to cancel the message so via 1215 proceed to 1218 done.

FIG. 12 illustrates, generally at 1200, another one embodiment of the invention showing a vehicle to vehicle communication. At 1202 a first vehicle detects a second vehicle 1204. At 1206 a determination is made if the vehicles can send and/or receive message. If not then path 1207 leads to 1218 an end. If the vehicles can communicate then that 1028 one of the vehicle operators can compose a message for the other vehicle operator and send the message 1210. At 1212 a determination is made if the message has been received. If not then via 1213 return is to make to 1208 where the message may be composed or in one embodiment the vehicle operator can determine if it should be sent again. IF received then path to 1216 may issue a "thanks" or "received" message an then to end at 1218. In optional path 1215 there is no communication acknowledgment and proceed directly to 1218 end.

FIG. 13 illustrates, generally at 1300, one embodiment of the invention showing reading, replying, and composing messages while not driving. While not driving device 1302 has a display area 1310, and dedicated control and command areas 1312. In the embodiment shown in FIG. 13 the display area 1310 may also have control and command as well as input areas. At 1304 is an operational mode that allows the user of device 1302 while not driving to listen to a recorded message. 1304 or while not driving to view the text of a recorded message 1303. The user of the device 1302 while not driving can send a voice message to the driver of a moving vehicle by recording 1305 the message. Note that in this mode of the embodiment of the invention the recorded message will be played back to the driver of the moving vehicle as recorded. The user of the device 1302 while not driving can send a text message 1306 to the driver of a moving vehicle. Note that in this mode of the embodiment of the invention the text message will be played back to the driver of the moving vehicle as a speech synthesized voice. At 1307 is illustrated an option to delete a message. At 1308 is shown a reply response that was prepared.

Figure 14:
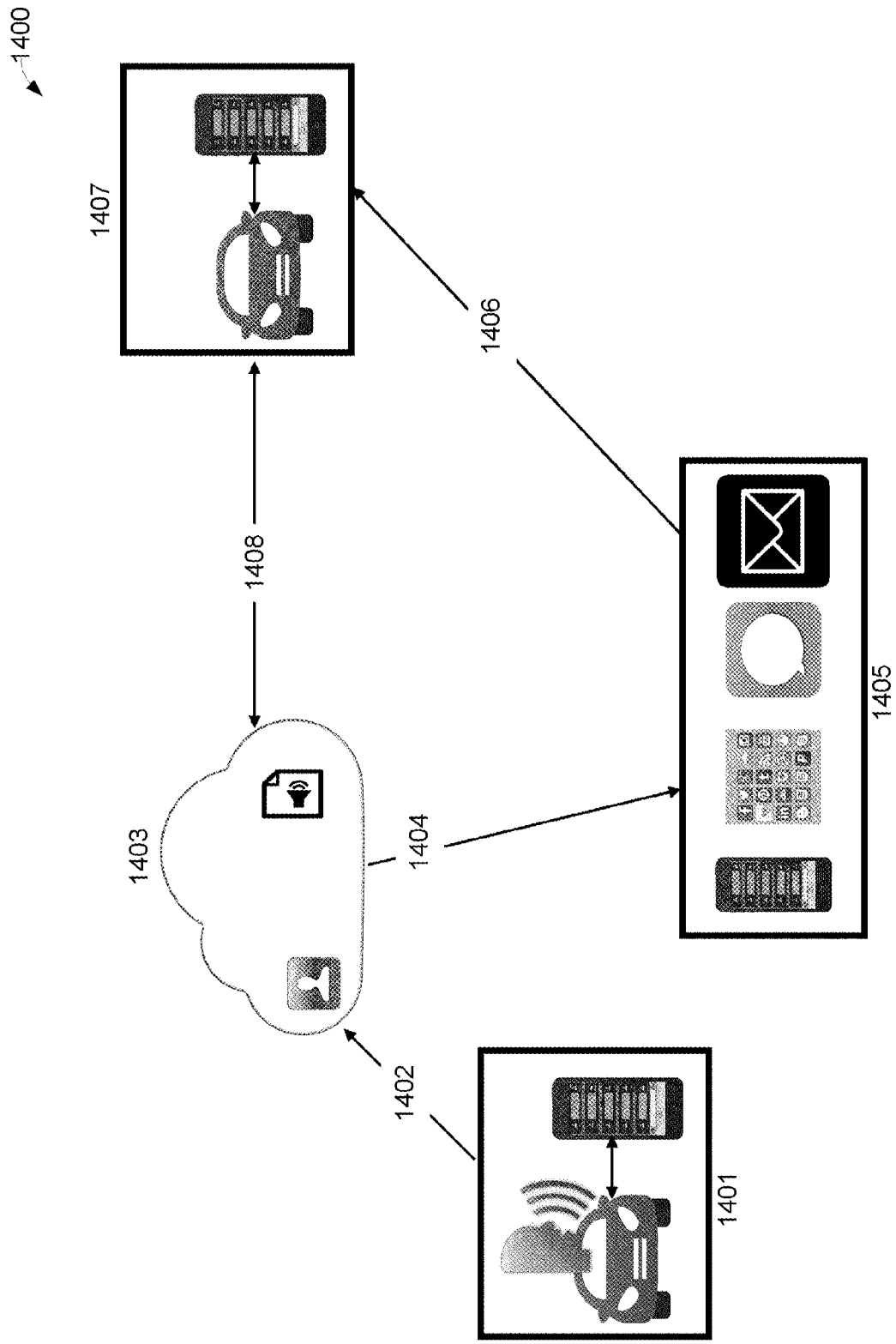
FIG. 14 illustrates one embodiment of the invention showing vehicle to vehicle messaging using the cloud.

FIG. 14 illustrates, generally at 1400, one embodiment of the invention showing vehicle to vehicle messaging using the cloud. In FIG. 14 the vehicle is illustrated as a car. At 1401 is vehicle with a voice input mechanism, such as but not limited to, a phone, microphone, etc. At 1403 is the cloud having various capabilities, for example, but not limited to routing, storage, and playback. At 1405 are various devices for reaching a person, such as, but not limited to a phone, text, voice mail, email, etc. At 1407 is a vehicle having an interface for interacting with the cloud. In one embodiment at 1042 is communications link between 1401 and 1403, at 1404 a communications link from 1403 to 1405, at 1406 a communications link from 1405 to 1407, and at 1408 a communications link between 1403 and 1407.

In one embodiment, for example, as illustrated in FIG. 14, at 1401 a vehicle driver records a voice message which via 1402 goes to the cloud 1402 where it is stored to eventually be delivered to the recipient (at 1407). The cloud 1403 has an engine that via link 1404 notifies the recipient a mechanism at 1405 of a pending message through one or more ways at its disposal, such as but not limited to, a phone application, text message, email, social media, etc. In one embodiment, the notification from the cloud shows up on a recipient's phone and triggers a download of the voice message from the cloud when convenient. In one embodiment the notification at 1405 presents itself via 1406 on recipient's device at 1407 and the download occurs from 1403 to 1407 via 1408. In one embodiment of the invention a voice message is downloaded from the cloud 1403 via 1408 to 1407 where it is stored on a receiver, for example, a phone, for convenient playback. In on embodiment of the invention when the message is played back at 1407 a communication is sent from 1407 via 1408 to cloud 1403 informing it to delete the message from the cloud 1403. The following algorithm performs the following functions for messages: transforming, determining, playing, sending, receiving, prompting, figsigs, storing, sensing. If run on a general purpose processor this converts it into a specialized machine.

```
IO_STATUS IO_ReadWrite(IOCommand *command, Uint16
*readBytes, Uint16 numBytes)
{
        IO_STATUS    status = STATUS_PASS;
        Int16        result;
   Uint16      cmdBuffer[3];
   Uint16    startStop;
   Uint16    read1, read2;
   startStop = ((I2C_START) | (I2C_STOP));
   if (NULL == command)
   {
        status = STATUS_FAIL;
            return (status);
   }
   if ((command->readOrWrite & (READ_AND_WRITE |
WRITE_ONLY)) > 0)
   {
   if (command->isParam)
   {
      cmdBuffer[0] = REG_PARAM_WR; //+ 0x40 autoinrement
      cmdBuffer[1] = command->arg;
      // write the arg to PARAM_WR first
      result = I2C_write(cmdBuffer, 2,
            command->chipAddr, TRUE, startStop,
            I2C_MAX_TIMEOUT);
      if(SOK != result)
      {
        status = (STATUS_FAIL);
        goto Deinit;
      }
      DSP_wait(30);
      cmdBuffer[0] = REG_COMMAND;
      cmdBuffer[1] = 0xA0 + (command->cmdRegister & 0x1F);
      // write the arg to PARAM_WR first
      result = I2C_write(cmdBuffer, 2,
            command->chipAddr, TRUE, startStop,
            I2C_MAX_TIMEOUT);
      if(SOK != result)
      {
        status = (STATUS_FAIL);
        goto Deinit;
      }
   }
   else if (command->isCommand)
   {
      cmdBuffer[0] = REG_COMMAND;
      cmdBuffer[1] = command->cmdRegister;
      result = I2C_write(cmdBuffer, 2,
            command->chipAddr, TRUE, startStop,
            I2C_MAX_TIMEOUT);
      if(SOK != result)
      {
        status = (STATUS_FAIL);
        goto Deinit;
      }
   }
   else
   {
      cmdBuffer[0] = command->cmdRegister;
      cmdBuffer[1] = command->arg;
      DSP_wait(10);
      /* Regular register Write data */
      result = I2C_write(cmdBuffer, 2,
            command->chipAddr, TRUE, startStop,
            I2C_MAX_TIMEOUT);
      if(SOK != result)
      {
        status = (STATUS_FAIL);
        goto Deinit;
      }
   }
}
```

-continued

```
   if ((NULL != readBytes) && ((command->readOrWrite &
(READ_AND_WRITE|READ_ONLY)) > 0))
   {
      cmdBuffer[0] = command->cmdRegister;
      cmdBuffer[1] = command->arg;
      // if this was a parameter write and read, then the response is in
PARAM_RD
      // else we need to query the command register
      if (command->isParam)
      {
         if ((command->readOrWrite & READ_ONLY) > 0)
         {
            cmdBuffer[0] = REG_COMMAND;
            cmdBuffer[1] = 0x80 + (command->cmdRegister & 0x1F);
            // write the arg to PARAM_WR first
            result = I2C_write(cmdBuffer, 2,
                  command->chipAddr, TRUE, startStop,
                  I2C_MAX_TIMEOUT);
            if(SOK != result)
            {
               status = (STATUS_FAIL);
               goto Deinit;
            }
         }
         cmdBuffer[0] = REG_PARAM_RD;
         DSP_wait(30); //wait 30 msecs
      }
      *read Bytes = 0;
      /* Read data */
      if (command->isParam)
      {
         result = I2C_read(readBytes, 1, command->chipAddr,
               cmdBuffer, 1, TRUE,
               startStop, I2C_MAX_TIMEOUT, FALSE);
      }
      else
      {
         result = I2C_read(readBytes, numBytes, command->chipAddr,
               cmdBuffer, 1, TRUE,
               startStop, I2C_MAX_TIMEOUT, FALSE);
      }
      if(SOK != result)
      {
         status = (STATUS_FAIL);
         goto Deinit;
      }
   }
Deinit:
      return (status);
}
```

FIG. 8 illustrates various embodiments of the invention as indicated below.

Illustrated generally at 1. A method for a user interaction to an incoming message on a device wherein said user is driving, the method comprising in order: (a) transforming on said device said incoming message into a contact information, said contact information identifying a source of said incoming message; then (b) determining if said incoming message on said device is in a form selected from the group consisting of a text message and a voice message; and then (c) when said form is said text message; then (c1) transforming said text message into a synthesized speech; then (c2) playing said synthesized speech, wherein said playing is of a sufficient volume for said user to hear said synthesized speech; (d) when said form is said voice message; then (d1) playing said voice message, wherein said playing is of a sufficient volume for said user to hear said voice message.

Illustrated generally at 2. The method of claim 1 further comprising: (c3) determining when said playing said synthesized speech has completed; and then (c4) prompting said user via an audio request if said user wants to respond to said synthesized speech.

Illustrated generally at 3. The method of claim 2 further comprising: (c5) sensing a first figsigs after (c4) when said form is said text message; and then (c6) transforming said sensed first figsigs into a first command.

Illustrated generally at 4. The method of claim 3 wherein said first command causes a processor coupled to a memory to not activate one or more microphones.

Illustrated generally at 5. The method of claim 3 wherein said first command causes a processor coupled to a memory to activate one or more microphones.

Illustrated generally at 6. The method of claim 5 further comprising: transforming one or more analog outputs from said one or more microphones into one or more digital outputs, said one or more digital outputs having at least one output with 7 or more bits of resolution; and storing at least one of said one or more digital outputs in said memory.

Illustrated generally at 7. The method of claim 6 further comprising: transforming said one or more analog outputs from said one or more microphones into a second command selected from the group consisting of recording and not recording; and when said second command is said not recording; then transforming said stored memory at least said one of said one or more digital outputs into an analog output; then playing said analog output, wherein said playing said analog output is of a sufficient volume for said user to hear said analog output.

Illustrated generally at 8. The method of claim 7 further comprising: sensing a second figsigs after (c4) when said form is said text message; and transforming said sensed second figsigs into a second command. Illustrated generally at 9. The method of claim 8 wherein said second command causes said processor coupled to said memory to transform said stored memory at least said one of said one or more digital outputs into a modulation output.

Illustrated generally at 10. The method of claim 9 wherein said modulation output is communicated via a wireless means beyond an outermost perimeter of a vehicle in which said user performed said first figsigs.

Illustrated generally at 11. The method of claim 1 further comprising: (d2) determining when said playing said voice message has completed; and then (d3) prompting said user via an audio request if said user wants to respond to said voice message.

Illustrated generally at 12. The method of claim 11 further comprising: (d4) sensing a first figsigs after (d3) when said form is said voice message; and then (d5) transforming said sensed first figsigs into a first command.

Illustrated generally at 13. The method of claim 12 wherein said first command causes a processor coupled to a memory to not activate one or more microphones.

Illustrated generally at 14. The method of claim 12 wherein said first command causes a processor coupled to a memory to activate one or more microphones.

Illustrated generally at 15. The method of claim 14 further comprising: transforming one or more analog outputs from said one or more microphones into one or more digital outputs, said one or more digital outputs having at least one output with 8 or more effective bits of resolution; and storing at least one of said one or more digital outputs in said memory.

Illustrated generally at 16. The method of claim 15 further comprising: transforming said one or more analog outputs from said one or more microphones into a second command selected from the group consisting of recording and not recording; and when said second command is said not recording; then transforming said stored memory at least said one of said one or more digital outputs into an analog output; then playing said analog output, wherein said playing said analog output is of a sufficient volume for said user to hear said analog output.

Illustrated generally at 17. The method of claim 16 further comprising: sensing a second figsigs after (d3) when said form is said voice message; and transforming said sensed second figsigs into a second command, wherein said second command causes said processor coupled to said memory to transform said stored memory at least said one of said one or more digital outputs into a modulation output.

Illustrated generally at 18. The method of claim 9 wherein said modulation output is communicated via a wireless means beyond an outermost perimeter of a vehicle in which said user performed said first figsigs.

Illustrated generally at 19. The method of claim 1 wherein said incoming message is from a second user, said second user driving a vehicle, and said incoming message is via an entity selected from the group consisting of WiFi, Bluetooth, ZigBee, and WRAN.

Illustrated generally at 20. An apparatus comprising: a wireless message receiver having a wireless input, a wireless output, a data output, and a data input; a processor coupled to a memory, said processor operatively coupled to said wireless message receiver data input, said processor operatively coupled to said wireless message receiver data output; a contact extraction unit, said contact extraction unit having an input, and an output, said contact extraction unit input operatively coupled to said wireless message receiver data output, said contact extraction unit output operatively coupled to said processor; a format determination unit, said format determination unit having an input, and an output, said format determination unit input operatively coupled to said wireless message receiver data output, said format determination unit output operatively coupled to said processor; a reformat message unit, said reformat message unit having an input, and an output, said reformat message unit input operatively coupled to said format determination unit output; a message outputting unit, said message outputting unit having an input, and an output, said message outputting unit input coupled to said reformat message unit output; a transformation unit having an input and an output, said message outputting unit output in operative communication with said transformation unit input, said transformation unit output coupled directly to an audio transducer; a user sensing unit having one or more inputs, and an output, at least one of said one or more inputs connected to audio sensor output, at least another of said one or more inputs connected to a figsigs detection unit output; said user sensing output in operative communication with said processor; and a command transform unit having an input and a plurality of outputs, said command transform unit input in communication with said user sensing unit output, one or more of said command transform unit plurality of outputs in communication with a transmit unit, a record unit, a rerecord unit, and a discard unit.

While the description above has described embodiments of the invention with respect to a driver in a vehicle such as a car, the invention is not so limited and anywhere a driver's attention is needed to navigate a vehicle without removing hands or vision being distracted the techniques disclosed may be used, for example, but not limited to, marine applications, aeronautical applications, etc.

Thus a Method and Apparatus for Safely and Reliably Sending and Receiving Messages While Operating a Motor Vehicle have been described.

Because of various considerations in embodiments of the present invention (for example, road noise, cabin noise, various speakers) specialized hardware is required.

Figure 1:
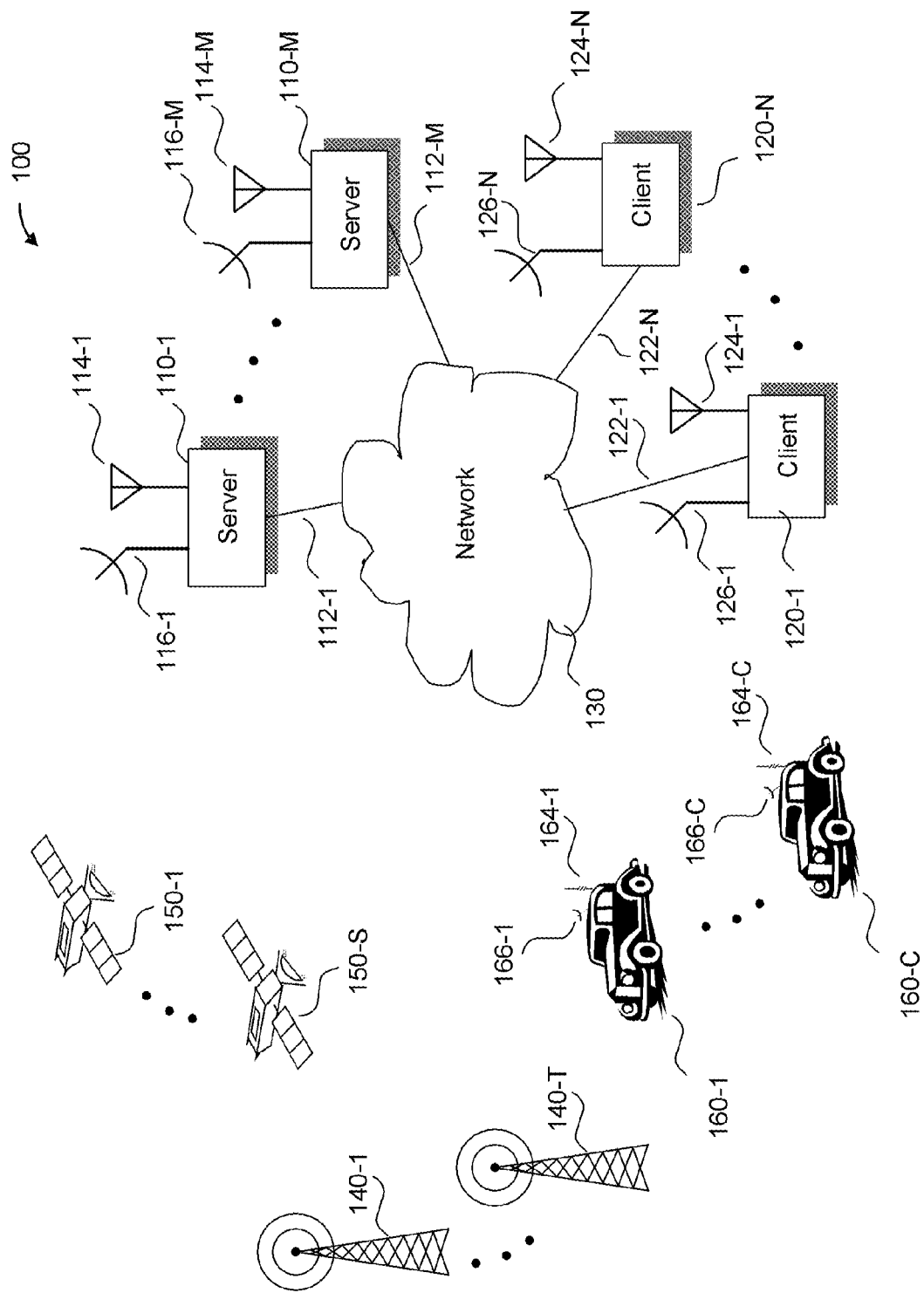
FIG. 1 illustrates a network environment in which the method and apparatus of the invention may be implemented.

FIG. 1 illustrates a network environment 100 from which the techniques described may be accessed and/or controlled. The network environment 100 has a network 102 that connects S servers 104-1 through 104-S, and C clients 108-1 through 108-C. More details are described below.

Figure 2:
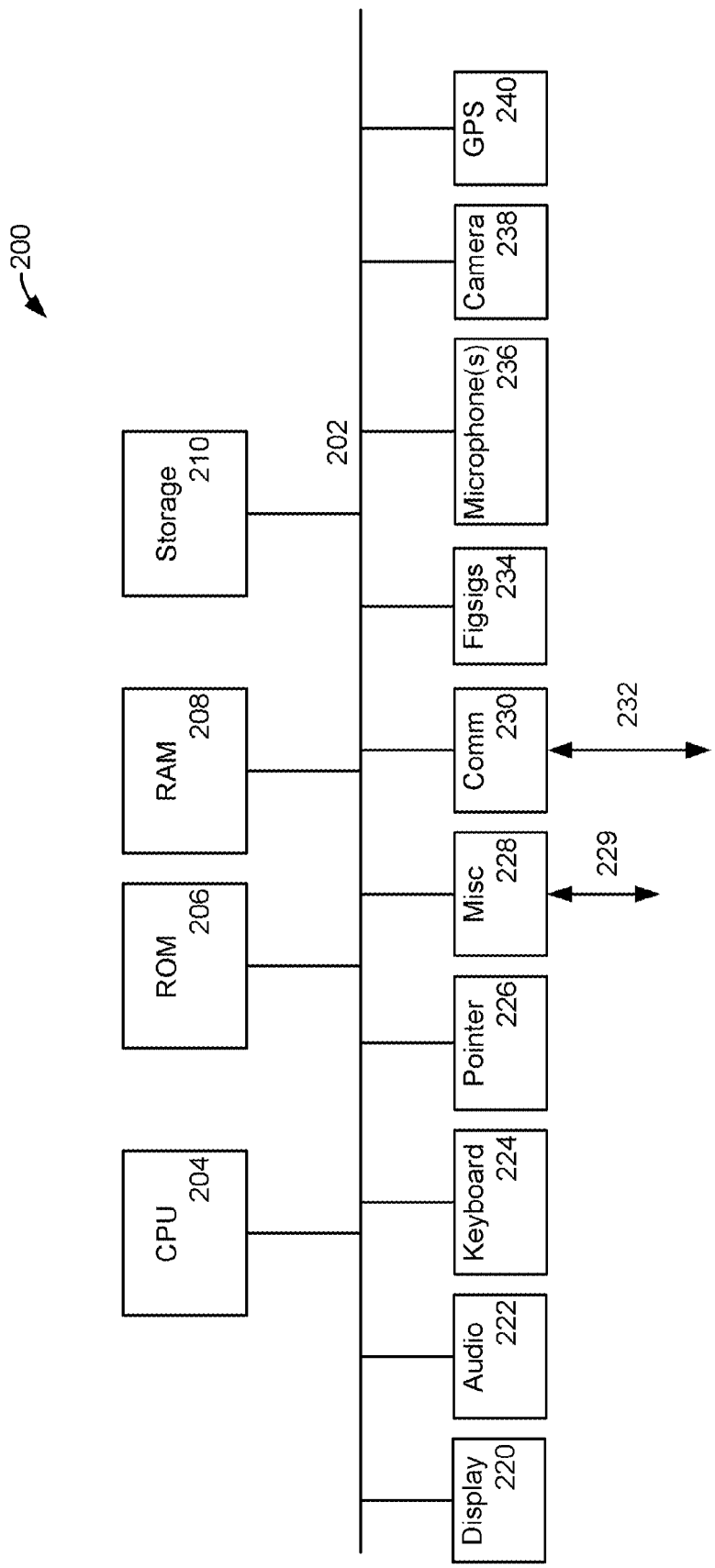
FIG. 2 is a block diagram of a computer system which may implement some embodiments of the invention and where some embodiments of the invention may be used.

FIG. 2 is a block diagram of a computer system 200 which some embodiments of the invention may employ parts of in conjunction with required specialized hardware and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied, accessed, and/or controlled. A plurality of computer systems are shown in the form of M servers (110-1 through 110-M), and N clients (120-1 through 120-N), which are coupled to each other via network 130. A plurality of terrestrial based wireless communications links are shown in the form of T towers (140-1 through 140-T). A plurality of space based communications links are shown as S satellites (150-1 through 150-S). A plurality of vehicles are shown in the form of C cars (160-1 through 160-C). The M servers and N clients may also be coupled to each other via space based communications links 150-1 through 150-S, as well as terrestrial based wireless communications links 140-1 through 140-T, or a combination of satellite and terrestrial wireless links. Additionally, the C cars 160-1 through 160-C may be in communication with the satellites 150-1 through 150-S and/or the terrestrial wireless links 140-1 through 140-T.

Servers 110-1 through 110-M may be connected to network 130 via connections 112-1 through 112-M, respectively. Servers 130-1 through 130-M may be connected to the terrestrial links 140-1 through 140-T via antennae 114-1 through 114-M, respectively. Servers 110-1 through 110-M may be connected to space based communications links 150-1 through 150-S via dish antennae 116-1 through 116-M.

Clients 120-1 through 120-N may be connected to the network 130 via connections 122-1 through 122-N. Clients 120-1 through 120-N may be connected to the terrestrial links 140-1 through 140-T via antennae 124-1 through 124-N. Clients 120-1 through 120-N may be connected to space based communications links 150-1 through 150-S via dish antennae 126-1 through 126-N.

Cars 160-1 through 160-C may be connected to the terrestrial links 140-1 through 140-T via antennae 164-1 through 164-C. Cars 160-1 through 160-C may be connected to space based communications links 150-1 through 150-S via antennae 166-1 through 166-C.

Clients 120-1 through 120-N may consist of, but are not limited to, for example, a set-top box, a receiver, a television, a game platform, or other receiving devices such as portable cell phones, smartphones, telematics, wearables, etc. Applications may be running on the clients 120-1 through 120-N, while web pages and information being browsed may reside on the servers 110-1 through 110-M. Broadcasts may be coming from terrestrial sources 140-1 through 140T, and/or satellite links 150-1 through 150-S. For purposes of explanation, a single communication channel will be considered to illustrate one embodiment of the present techniques. It will be readily apparent that such techniques may be easily applied to multiple communication channels as well as simultaneous communications.

Network 130 may be a Wide Area Network (WAN), which includes the Internet, or other proprietary networks. Note that alternatively the network 130 may include one or more of a Local Area Network (LAN), satellite link, fiber network, cable network, or any combination of these and/or others. Network 130 may also include network backbones, long-haul telephone lines, Internet service providers, and various levels of network routers.

The servers may represent, for example, disk storage systems alone or storage and computing resources. Likewise, the clients may have computing, storage, and viewing capabilities. The method and apparatus described herein may be accessed and/or controlled by essentially any type of communicating means or device whether local or remote, such as a LAN, a WAN, a system bus, etc. For example, a network connection which communicates via for example wireless may control an embodiment of the invention having a wireless communications device.

Terrestrial links 140-1 through 140-T may be, for example, wireless cellular telephone service providers. Space based communications links 170-1 through 170-S may be, for example, satellite broadcasters, global positioning satellites (GPS), etc. Communications system 100 may be implemented in any number of environments.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228 via link 229, and communications 230 via port 232, Figsigs unit 234, Microphone(s) 236, Caners 238, and GPS 240. Communications 230 may include, but is not limited to, Ethernet, WAN, LAN, Internet connection, WiFi, WiMax, etc. The bus system 202 may be for example, one or more of such buses as a system bus, Peripheral Component Interconnect (PCI), PCI Express (PCIe), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc., all non-transitory medium. Display 220 might be, for example, used by an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate non-transitory physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a non-transitory computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of non-transitory media suitable for storing electronic instructions either local to the computer or remote to the computer.

The techniques presented herein are specifically related to particular computer or other apparatus. A specialized apparatus to perform the required methods is required. For example, any of the methods according to the present invention can be implemented in hard-wired circuitry specifically designed for the functionality disclosed, or by programming special hardware having, for example, in one embodiment, a particular machine such as a computer (or CPU) specifically designed with a 16 bit or greater barrel shifter and a carry look ahead arithmetic logic unit. As disclosed Applicant submits that any results are tied to a particular machine or apparatus and/or transform a particular article into a different state or thing and that such particulars and/or things are non-trivial. For example, in FIG. 2 at 220 is a display. The results of the specialized machine may return an electronic value and such a value can be stored in hardware on the specialized machine and transformed into a graphical representation that can be displayed to a user of the computer. For example, in one embodiment, the returned value may be stored as a group of physical electrons on a trapped gate of a flash memory device. These physical electrons may then be transformed into a graphical representation, for example, by twisting the molecules of a liquid crystal display so that a carrier signal can be modulated and produces on reception a molecular change in a rod and cone receptor of a human user to produce physical electrons thus producing a tangible useful result and transformation tied to a particular machine such as a computer specifically designed with a 16 bit or greater barrel shifter and a carry look ahead arithmetic logic unit. For example the specialized hardware is required for logical operations and comparisons of values. For example, in one embodiment, the returned value may be stored as a series of holes on a paper tape that may be read by a person (e.g. a blind person) by tactile sensation (e.g. output from a KSR-33 Teletype). As disclosed Applicant submits that these results are tied to a particular machine or apparatus and/or transform a particular article into a different state or thing and that such particulars and/or things are non-trivial and as such satisfy Bilski.

The methods of the invention may be implemented using computer software on the specialized hardware as noted supra. If written in a programming language conforming to a recognized standard, sequences of instructions designed to implement the methods can be compiled for execution on the specialized hardware. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action and produce a tangible concrete non-transitory result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a specialized computer system in which the techniques of the present invention may be practiced as well as implemented as an embodiment).

A machine-readable medium is understood to include any non-transitory mechanism for storing or transmitting information in a form readable by a machine (e.g., a computer). For example, a non-transitory machine-readable medium includes read only memory (ROM); random access memory (RAM); magnetic disk storage media; optical storage media; flash memory devices; devices having non-transitory storage.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus while particular embodiments and applications of the present invention have been illustrated and described, it is to be understood that the invention is not limited to the precise construction and components disclosed herein. Various modifications, changes and variations which will be apparent to one of skill in the art may be made in the arrangement, operation and details of the method and apparatus of the present invention disclosed herein without departing from the spirit and scope of the invention as defined in the claims.

What is claimed is:

1. A method for a user interaction to an incoming message on a device wherein said user is driving, the method comprising in order:
   (a) transforming on said device said incoming message into a contact information, said contact information identifying a source of said incoming message; then
   (b) determining if said incoming message on said device is in a form selected from the group consisting a text message and a voice message; and then
   (c) when said form is said text message; then
      (c1) transforming said text message into a synthesized speech; then
      (c2) playing said synthesized speech, wherein said playing is of a sufficient volume for said user to hear said synthesized speech; then
      (c3) determining when said playing said synthesized speech has completed; and then
      (c4) prompting said user via an audio request if said user wants to respond to said synthesized speech; then
      (c5) sensing a first figsigs after (c4) when said form is said text message; and then
      (c6) transforming said sensed first figsigs into a first command;
   (d) when said form is said voice message; then
      (d1) playing said voice message, wherein said playing is of a sufficient volume for said user to hear said voice message.

2. The method of claim 1 wherein said first command causes a processor coupled to a memory to not activate one or more microphones.

3. The method of claim 1 wherein said first command causes a processor coupled to a memory to activate one or more microphones.

4. The method of claim 3 further comprising:
   transforming one or more analog outputs from said one or more microphones into one or more digital outputs, said one or more digital outputs having at least one output with 7 or more bits of resolution; and
   storing at least one of said one or more digital outputs in said memory.

5. The method of claim 4 further comprising:
   transforming said one or more analog outputs from said one or more microphones into a second command selected from the group consisting of recording and not recording; and
   when said second command is said not recording; then
      transforming said stored memory at least said one of said one or more digital outputs into an analog output; then
      playing said analog output, wherein said playing said analog output is of a sufficient volume for said user to hear said analog output.

6. The method of claim 5 further comprising:
   sensing a second figsigs after (c4) when said form is said text message; and
   transforming said sensed second figsigs into a second command.

7. The method of claim 6 wherein said second command causes said processor coupled to said memory to transform said stored memory at least said one of said one or more digital outputs into a modulation output.

8. The method of claim 7 wherein said modulation output is communicated via a wireless means beyond an outermost perimeter of a vehicle in which said user performed said first figsigs.

9. A method for a user interaction to an incoming message on a device wherein said user is driving, the method comprising in order:
   (a) transforming on said device said incoming message into a contact information, said contact information identifying a source of said incoming message; then
   (b) determining if said incoming message on said device is in a form selected from the group consisting of a text message and a voice message; and then
   (c) when said form is said text message; then
      (c1) transforming said text message into a synthesized speech; then
      (c2) playing said synthesized speech, wherein said playing is of a sufficient volume for said user to hear said synthesized speech;
   (d) when said form is said voice message; then
      (d1) playing said voice message, wherein said playing is of a sufficient volume for said user to hear said voice message; then
      (d2) determining when said playing said voice message has completed; and then
      (d3) prompting said user via an audio request if said user wants to respond to said voice message; then
      (d4) sensing a first figsigs after (d3) when said form is said voice message; and then
      (d5) transforming said sensed first figsigs into a first command.

10. The method of claim 9 wherein said first command causes a processor coupled to a memory to not activate one or more microphones.

11. The method of claim 9 wherein said first command causes a processor coupled to a memory to activate one or more microphones.

12. The method of claim 11 further comprising:
   transforming one or more analog outputs from said one or more microphones into one or more digital outputs, said one or more digital outputs having at least one output with 8 or more effective bits of resolution; and storing at least one of said one or more digital outputs in said memory.

13. The method of claim 12 further comprising:

transforming said one or more analog outputs from said one or more microphones into a second command selected from the group consisting of recording and not recording; and when said second command is said not recording; then
transforming said stored memory at least said one of said one or more digital outputs into an analog output; then playing said analog output, wherein said playing said analog output is of a sufficient volume for said user to hear said analog output.

14. The method of claim 13 further comprising:

sensing a second figsigs after (d3) when said form is said voice message; and transforming said sensed second figsigs into a second command, wherein said second command causes said processor coupled to said memory to transform said stored memory at least said one of said one or more digital outputs into a modulation output.

15. The method of claim 7 wherein said modulation output is communicated via a wireless means beyond an outermost perimeter of a vehicle in which said user performed said first figsigs.

16. An apparatus comprising:

a wireless message receiver having a wireless input, a wireless output, a data output, and a data input;

a processor coupled to a memory, said processor operatively coupled to said wireless message receiver data input, said processor operatively coupled to said wireless message receiver data output;

a contact extraction unit, said contact extraction unit having an input, and an output, said contact extraction unit input operatively coupled to said wireless message receiver data output, said contact extraction unit output operatively coupled to said processor;

a format determination unit, said format determination unit having an input, and an output, said format determination unit input operatively coupled to said wireless message receiver data output, said format determination unit output operatively coupled to said processor;

a reformat message unit, said reformat message unit having an input, and an output, said reformat message unit input operatively coupled to said format determination unit output;

a message outputting unit, said message outputting unit having an input, and an output, said message outputting unit input coupled to said reformat message unit output;

a transformation unit having an input and an output, said message outputting unit output in operative communication with said transformation unit input, said transformation unit output coupled directly to an audio transducer;

a user sensing unit having one or more inputs, and an output, at least one of said one or more inputs connected to audio sensor output, at least another of said one or more inputs connected to a figsigs detection unit output; said user sensing output in operative communication with said processor; and a command transform unit having an input and a plurality of outputs, said command transform unit input in communication with said user sensing unit output, one or more of said command transform unit plurality of outputs in communication with a transmit unit, a record unit, a rerecord unit, and a discard unit.

* * * * *